(12) United States Patent
Kuroda et al.

(10) Patent No.: US 7,704,580 B2
(45) Date of Patent: Apr. 27, 2010

(54) INFORMATION RECORDING MEDIUM

(75) Inventors: Kazuo Kuroda, Tokorozawa (JP); Akira Imamura, Tokorozawa (JP)

(73) Assignee: Pioneer Corporation, Tokyo (JP)

(*) Notice: Subject to any disclaimer, the term of this patent is extended or adjusted under 35 U.S.C. 154(b) by 796 days.

(21) Appl. No.: 10/588,079

(22) PCT Filed: Jan. 31, 2005

(86) PCT No.: PCT/JP2005/001341

§ 371 (c)(1),
(2), (4) Date: Jul. 31, 2006

(87) PCT Pub. No.: WO2005/076268

PCT Pub. Date: Aug. 18, 2005

(65) Prior Publication Data

US 2007/0128402 A1    Jun. 7, 2007

(30) Foreign Application Priority Data

Feb. 3, 2004    (JP)    ............................. 2004-026665

(51) Int. Cl.
*B32B 3/02*    (2006.01)
(52) U.S. Cl. .................. 428/64.1; 428/64.4; 430/270.1; 369/275.3
(58) Field of Classification Search ........................ None
See application file for complete search history.

(56) References Cited

U.S. PATENT DOCUMENTS

| | | | | |
|---|---|---|---|---|
| 5,881,032 A | * | 3/1999 | Ito et al. | 369/30.1 |
| 6,807,142 B1 | * | 10/2004 | Nagata et al. | 369/275.2 |
| 2005/0013225 A1 | * | 1/2005 | Ogasawara | 369/53.22 |

FOREIGN PATENT DOCUMENTS

| | | |
|---|---|---|
| JP | 08-315370 | 11/1996 |
| JP | 09-022542 | 1/1997 |
| JP | 09-044898 | 2/1997 |
| JP | 09-147415 | 6/1997 |
| JP | 2000-311346 | 11/2000 |
| JP | 2001-023237 | 1/2001 |
| JP | 2003-168221 | 6/2003 |
| JP | 2004152398 A * | 5/2004 |

* cited by examiner

*Primary Examiner*—Elizabeth Mulvaney
(74) *Attorney, Agent, or Firm*—Young & Thompson

(57) ABSTRACT

An information recording medium comprising: a first recording layer in which a first recording track path to record therein record information is formed; and a second recording layer which is laminated on said first recording layer and in which a second recording tack path to record therein the record information is formed in a direction opposite to the first recording track path, in one recording layer of said first and second recording layers, a predetermined area in which focus leading of laser light is performed reflecting the laser light, in the other recording layer of said first and second recording layers, a facing area which faces the predetermined area not reflecting the laser light.

5 Claims, 16 Drawing Sheets

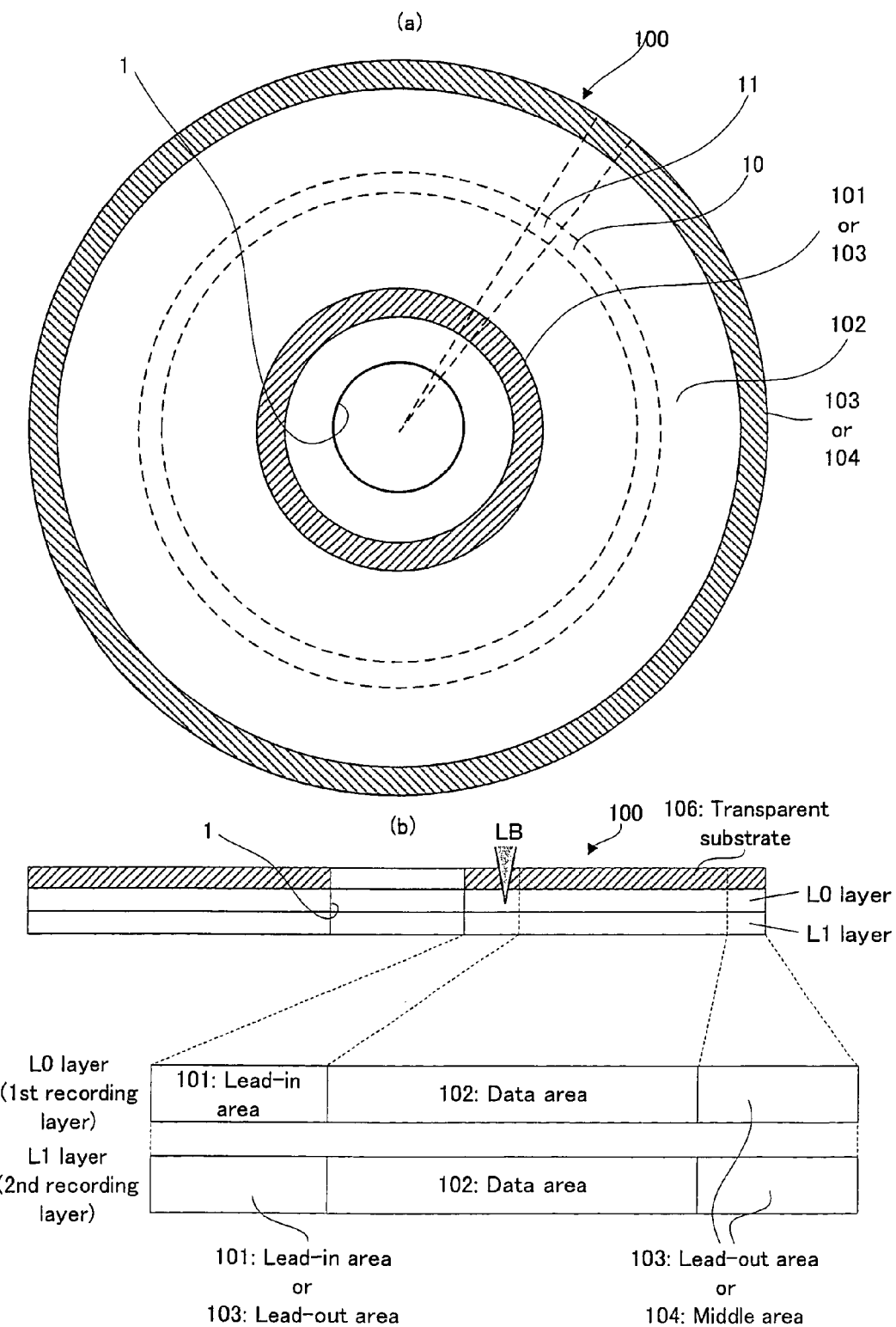

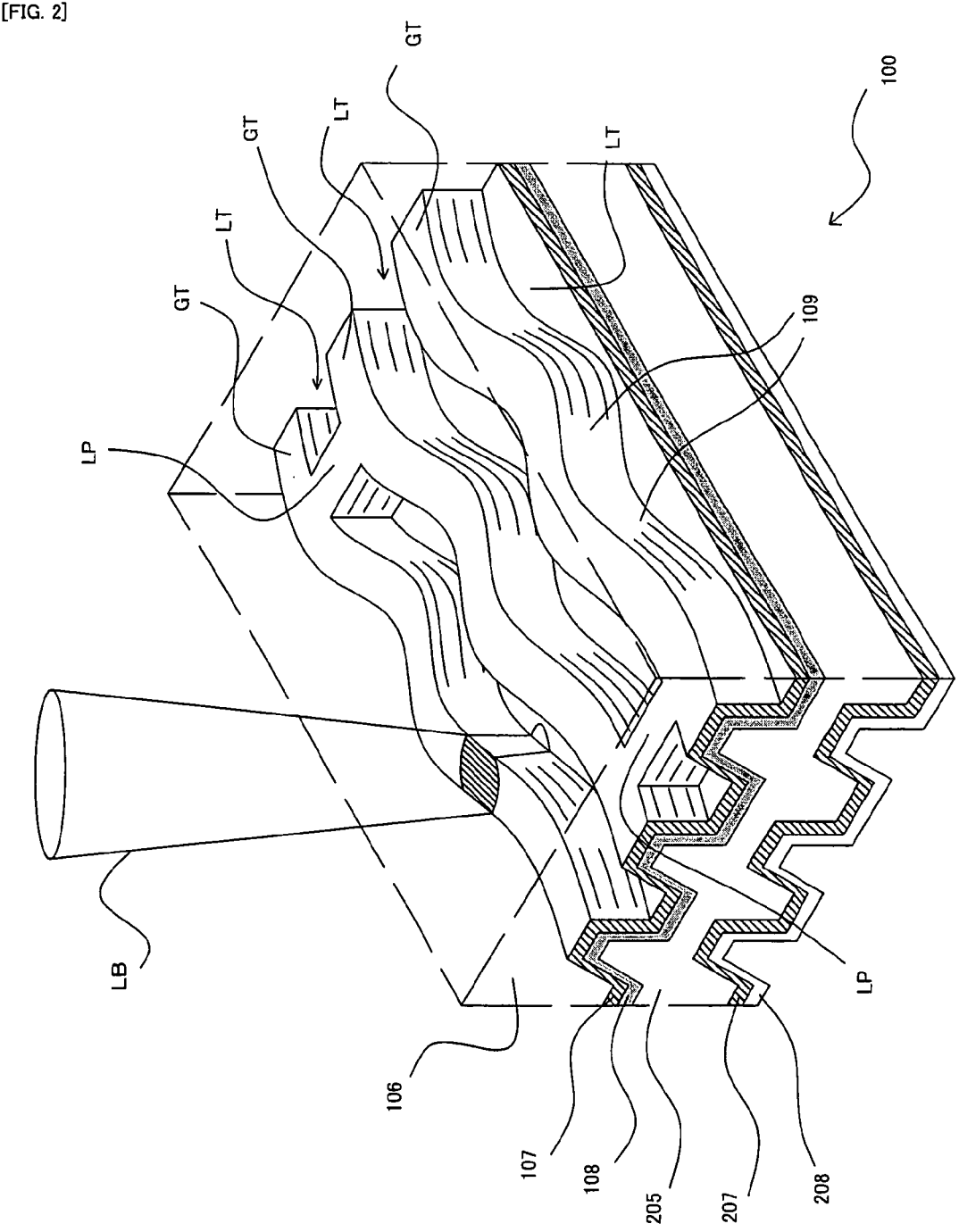
[FIG. 2]

[FIG. 3]
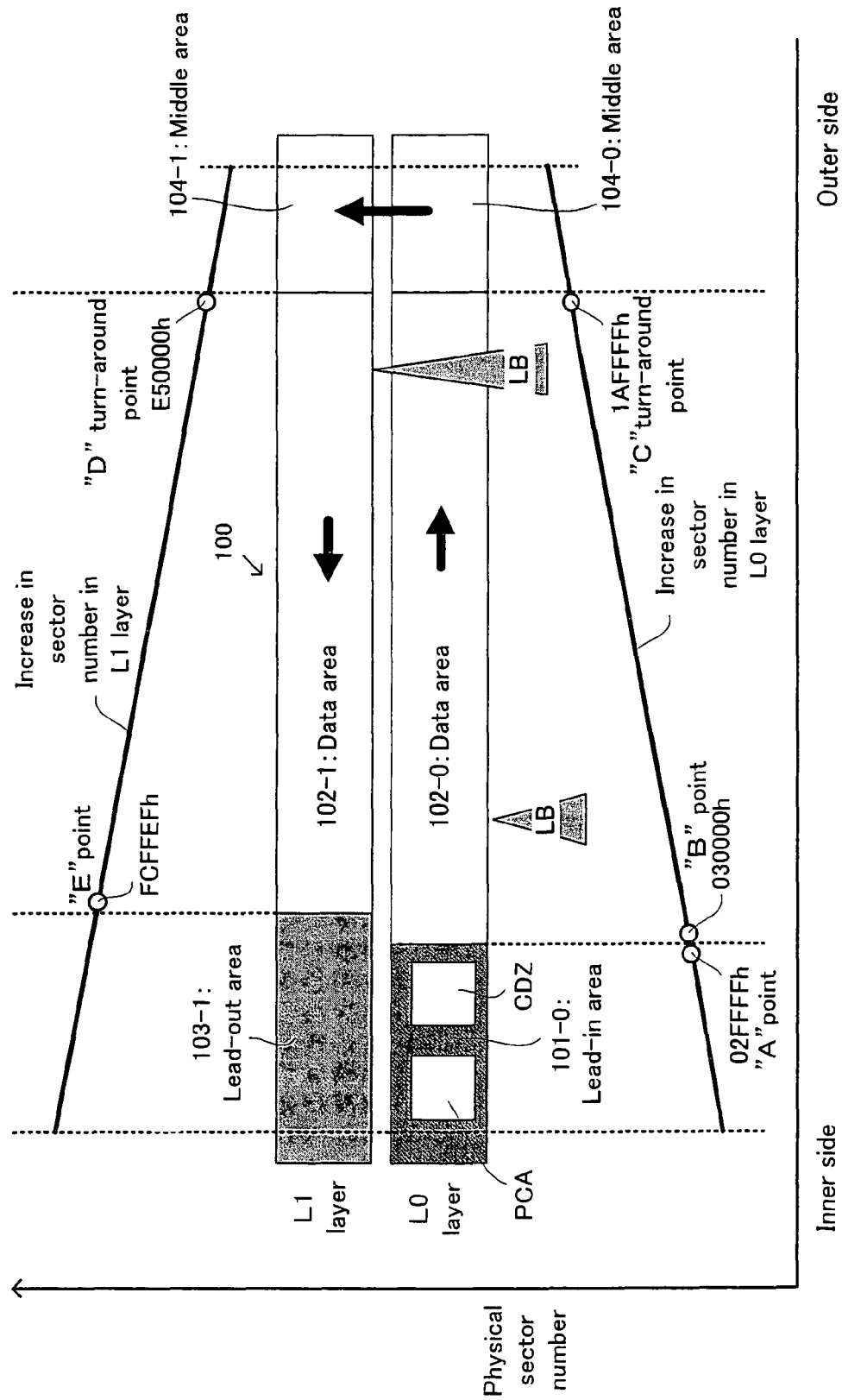

[FIG. 4]
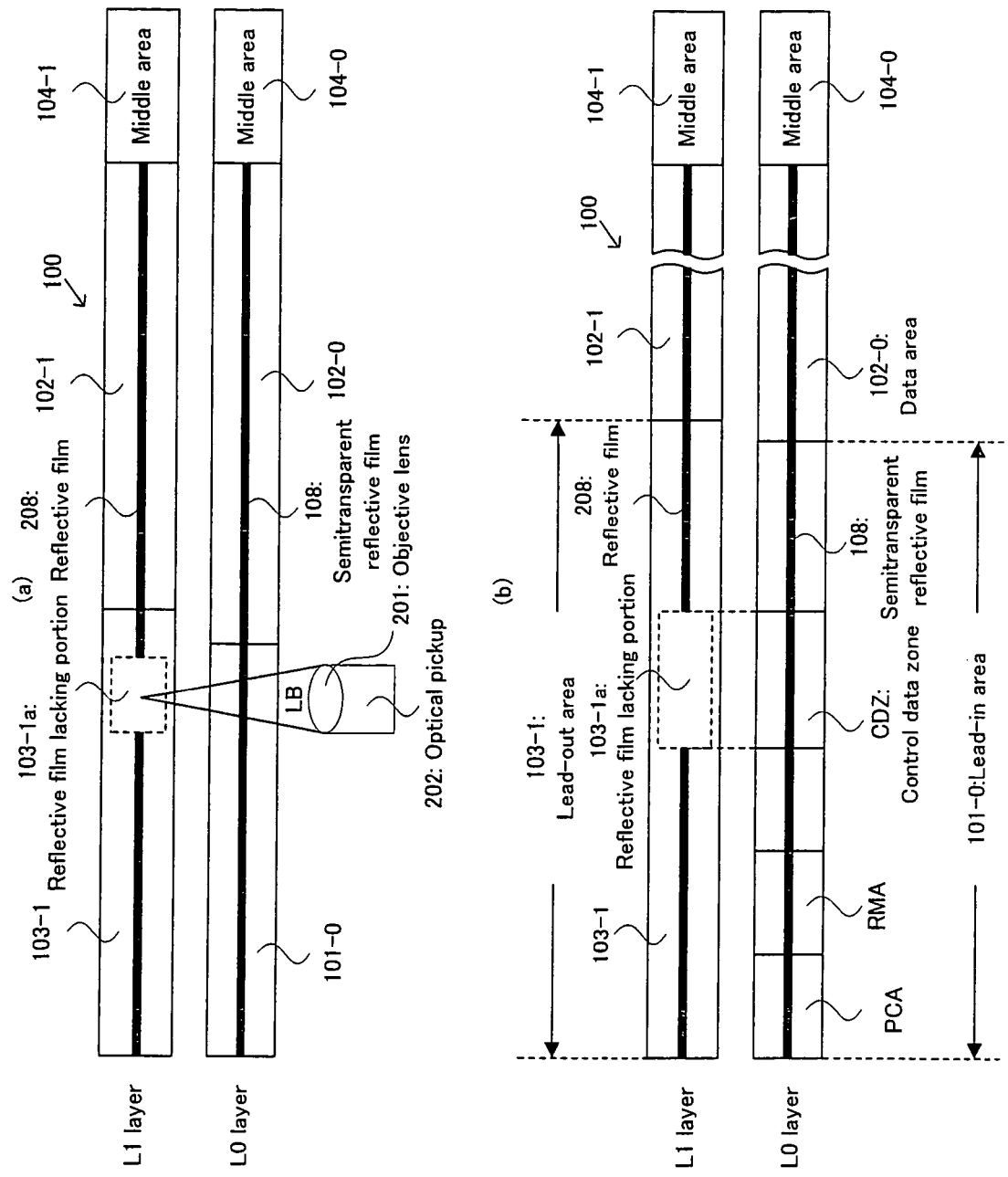

[FIG. 5]
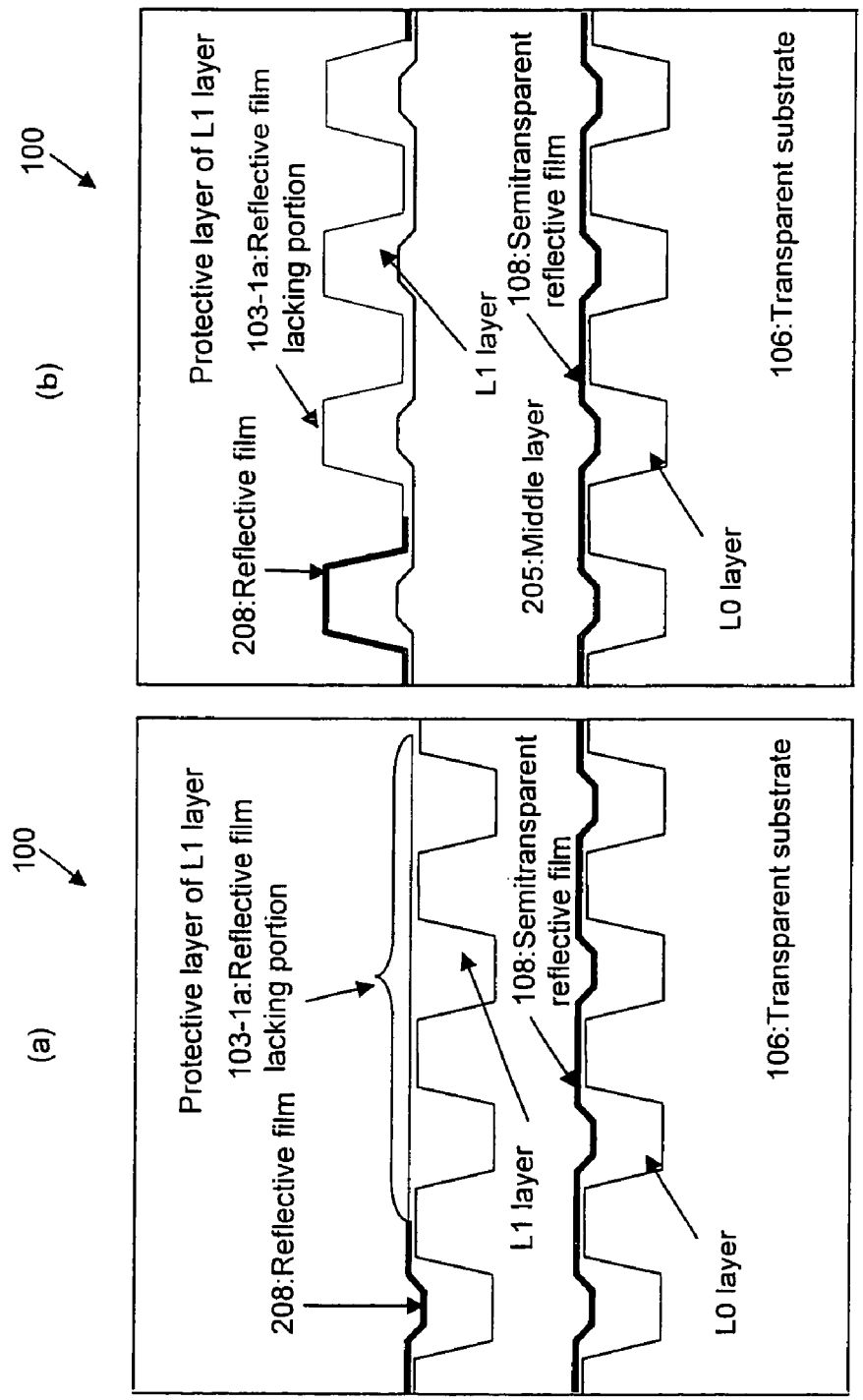

[FIG. 6]
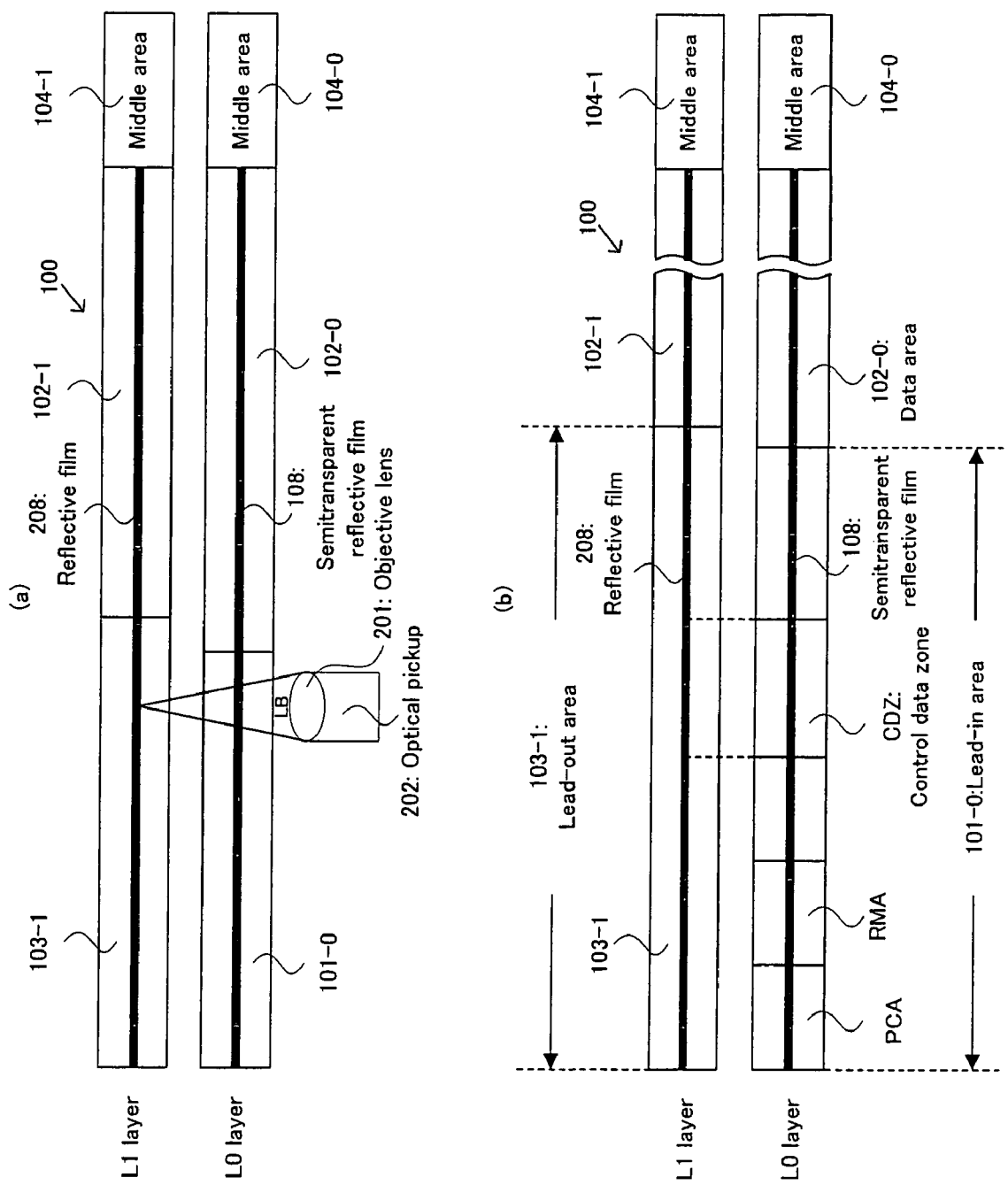

[FIG. 7]
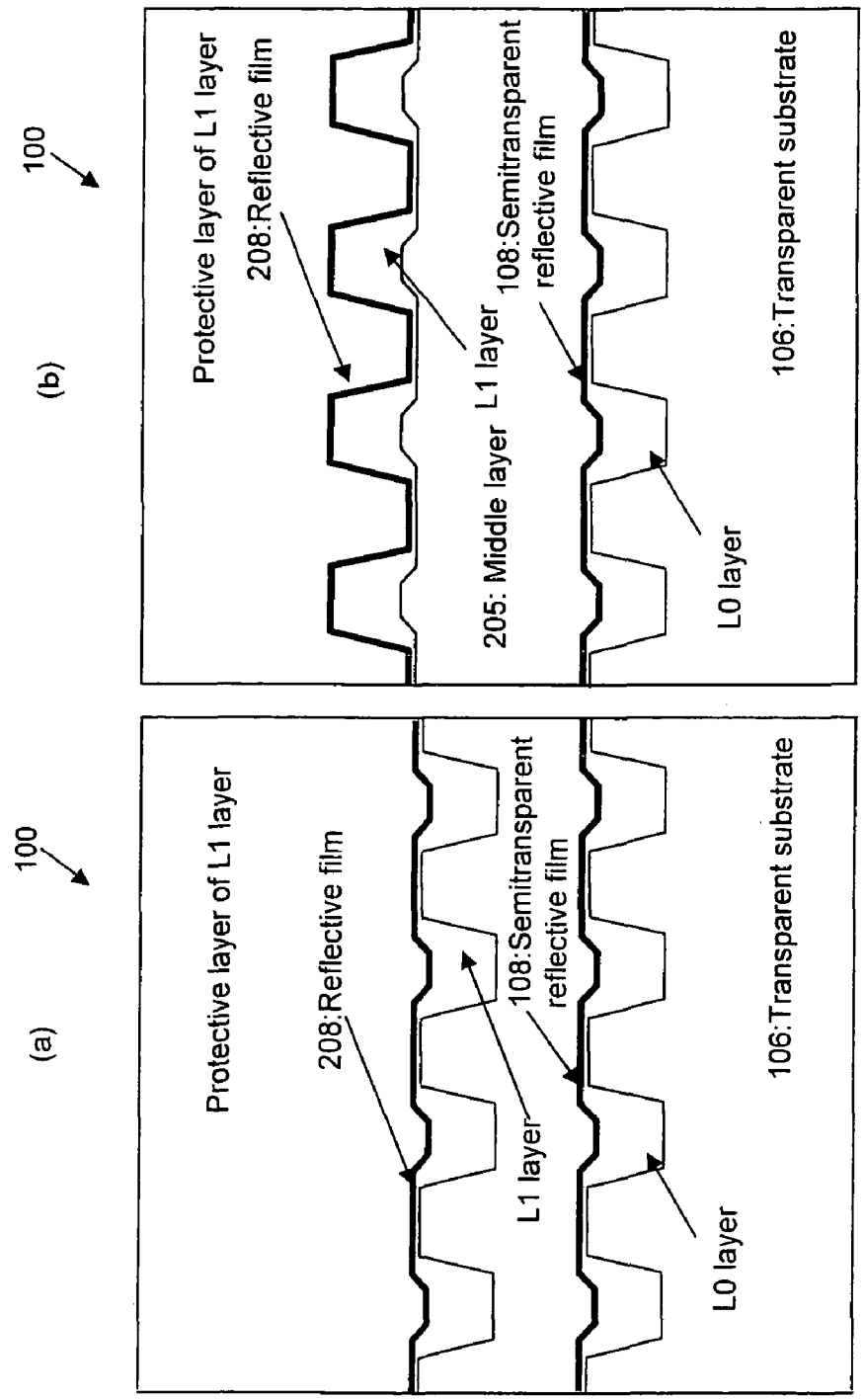

[FIG. 8]
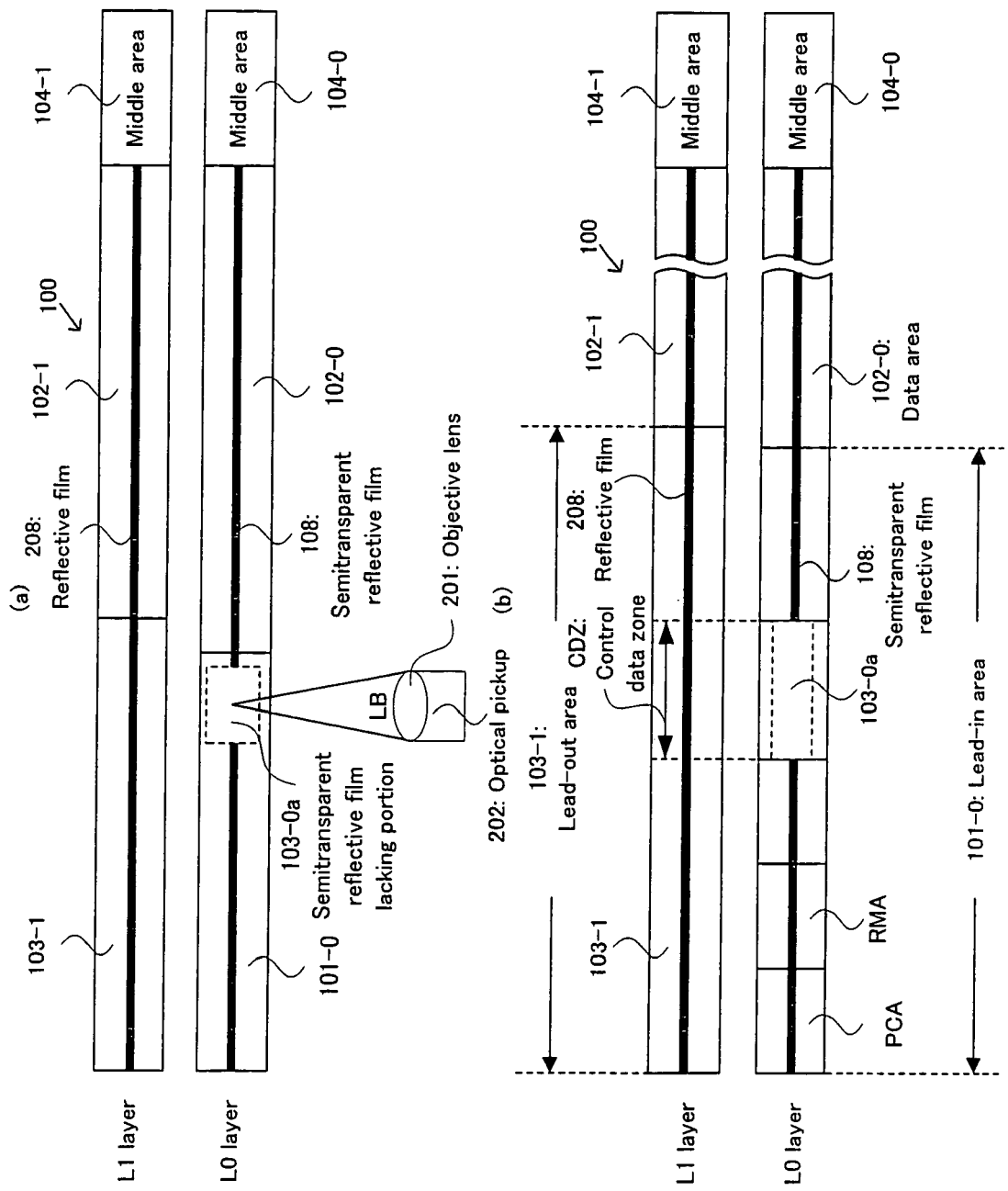

[FIG. 9]
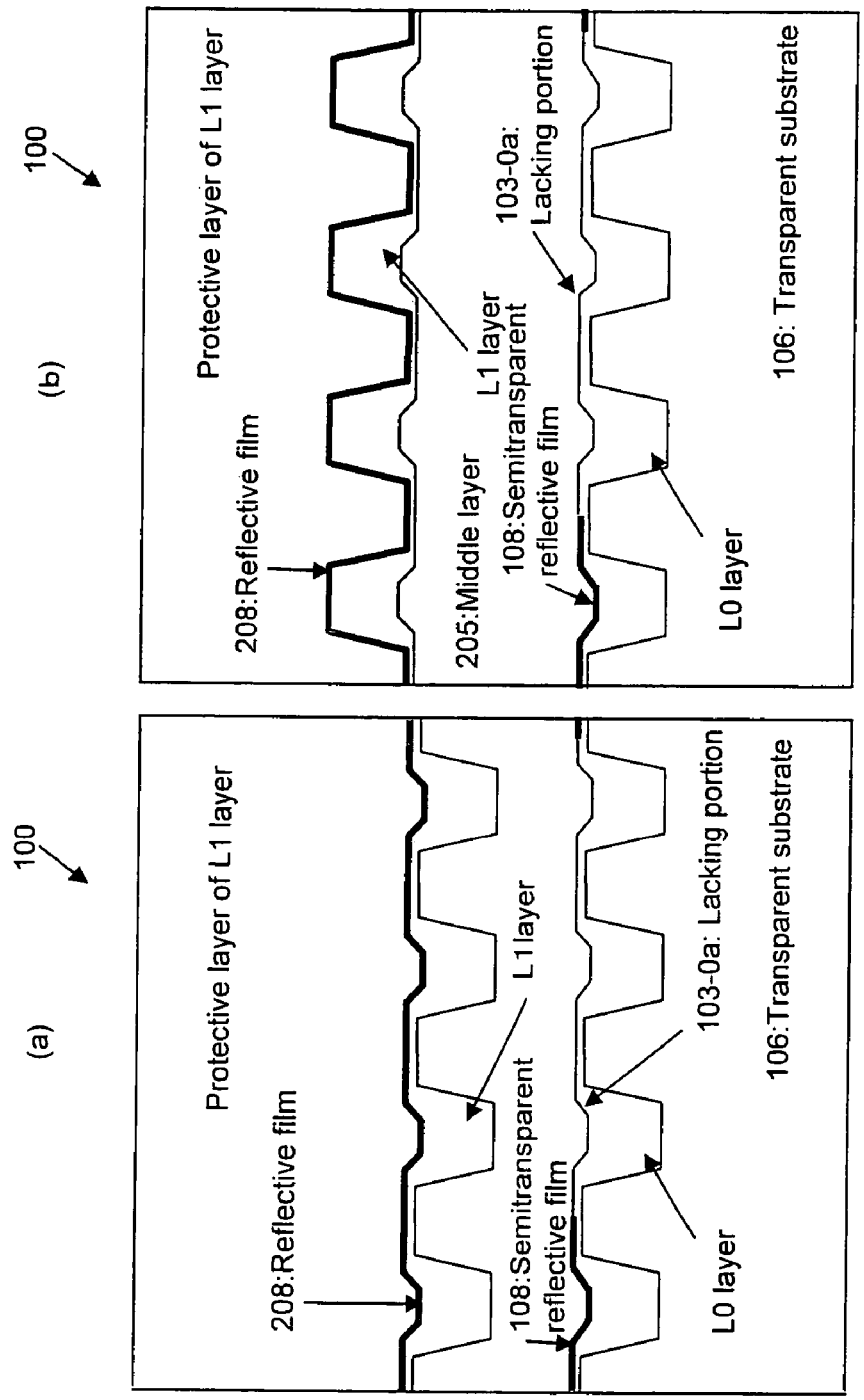

[FIG. 10]
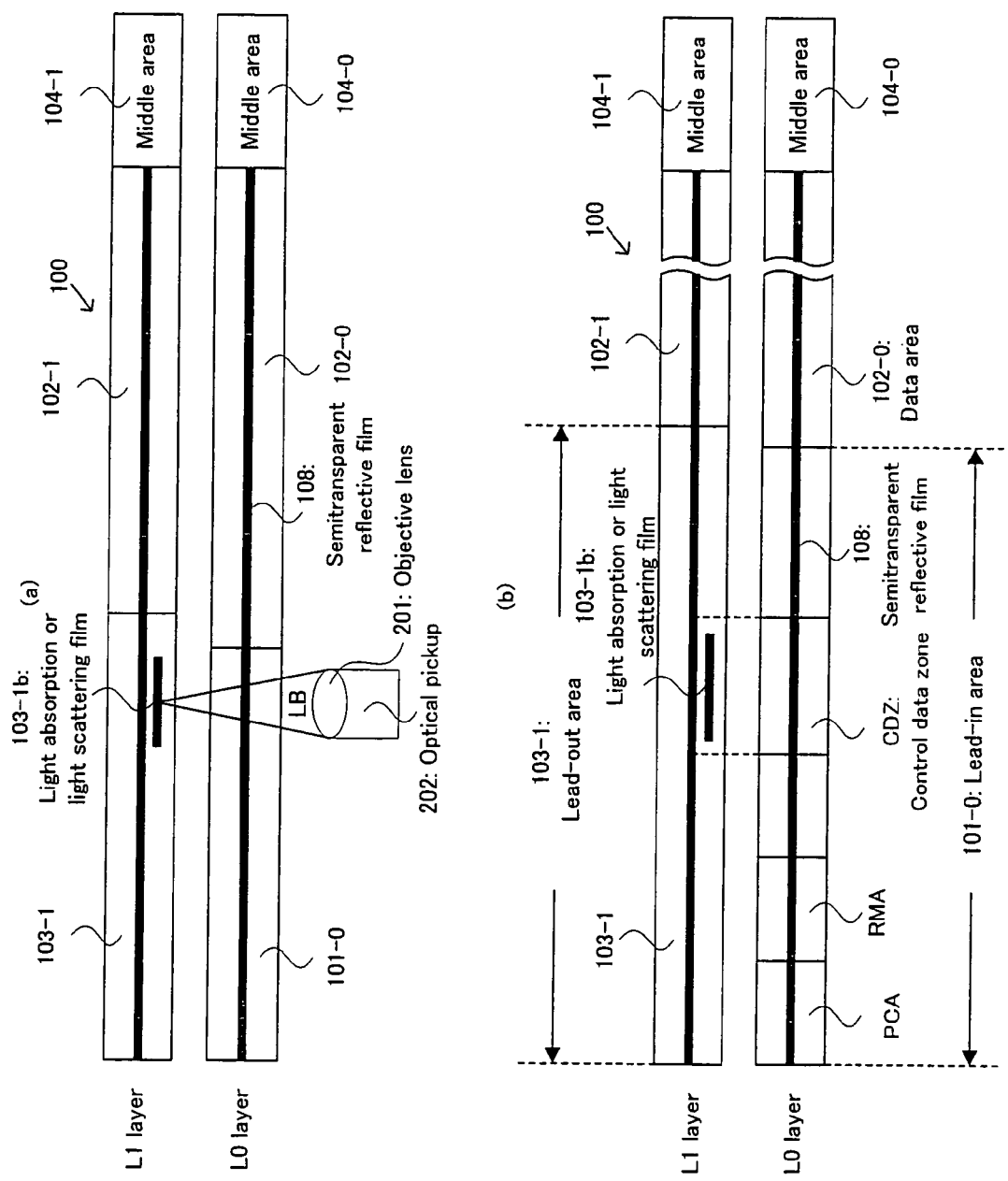

[FIG. 11]
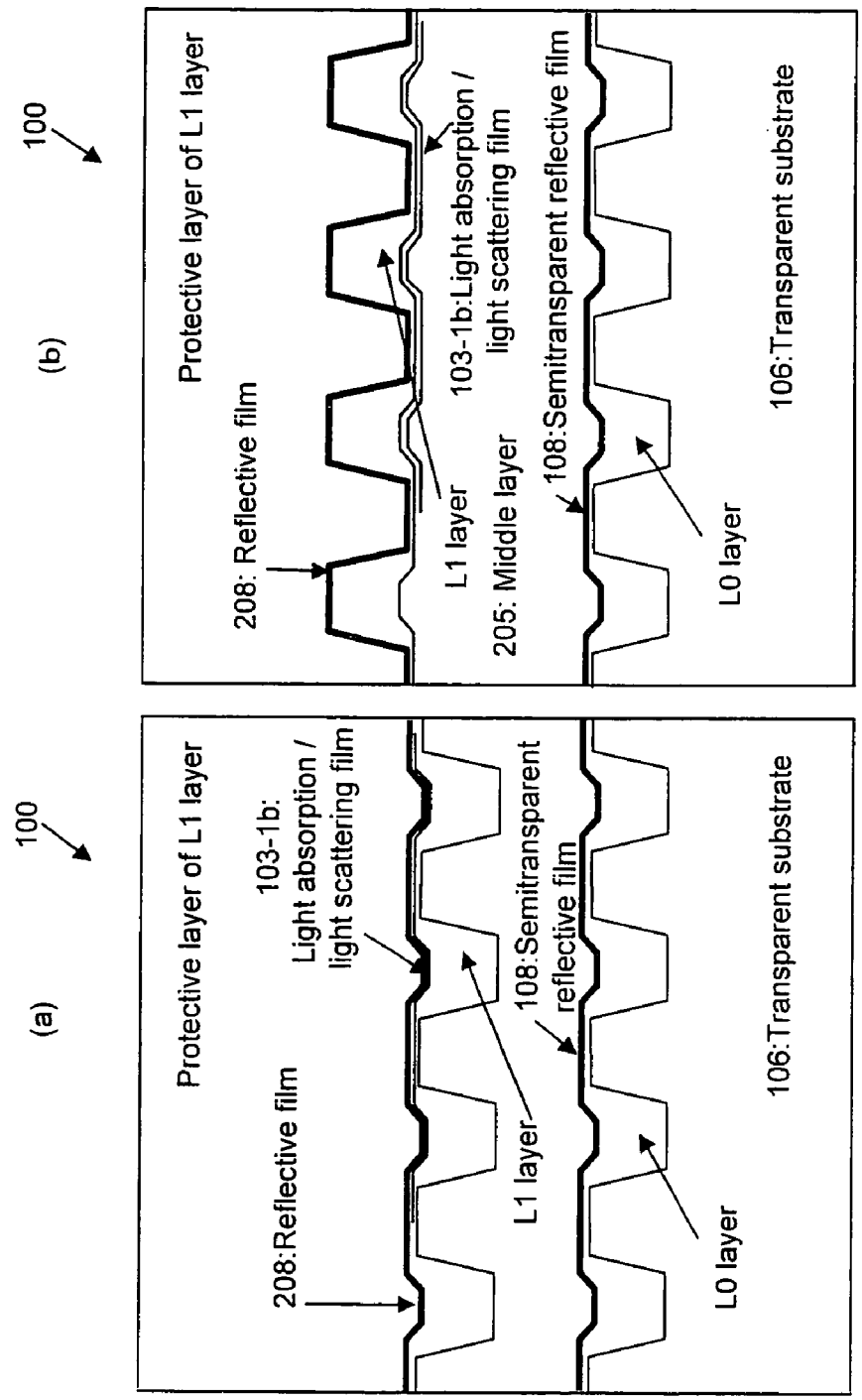

[FIG. 12]
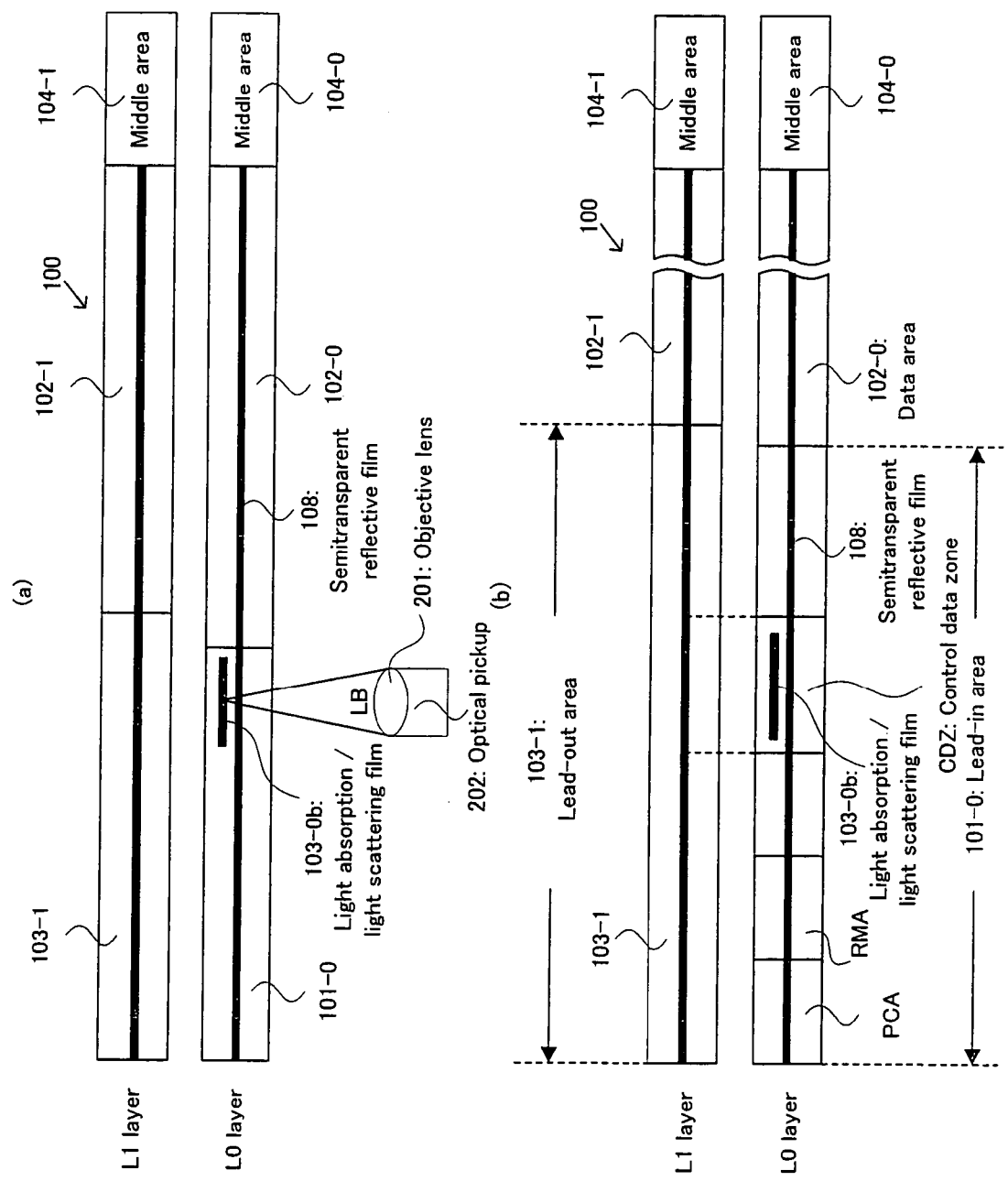

[FIG. 13]
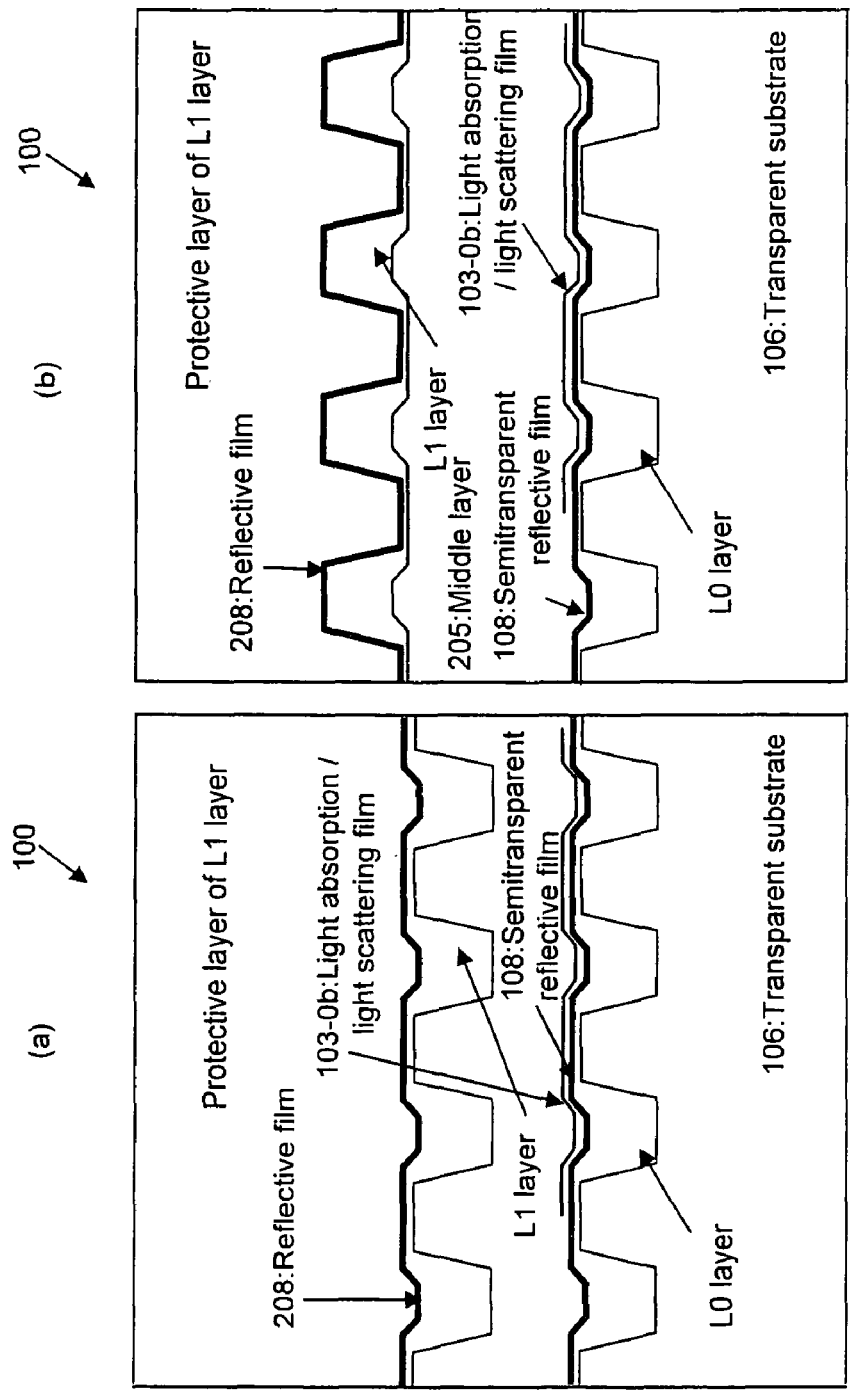

[FIG. 14]
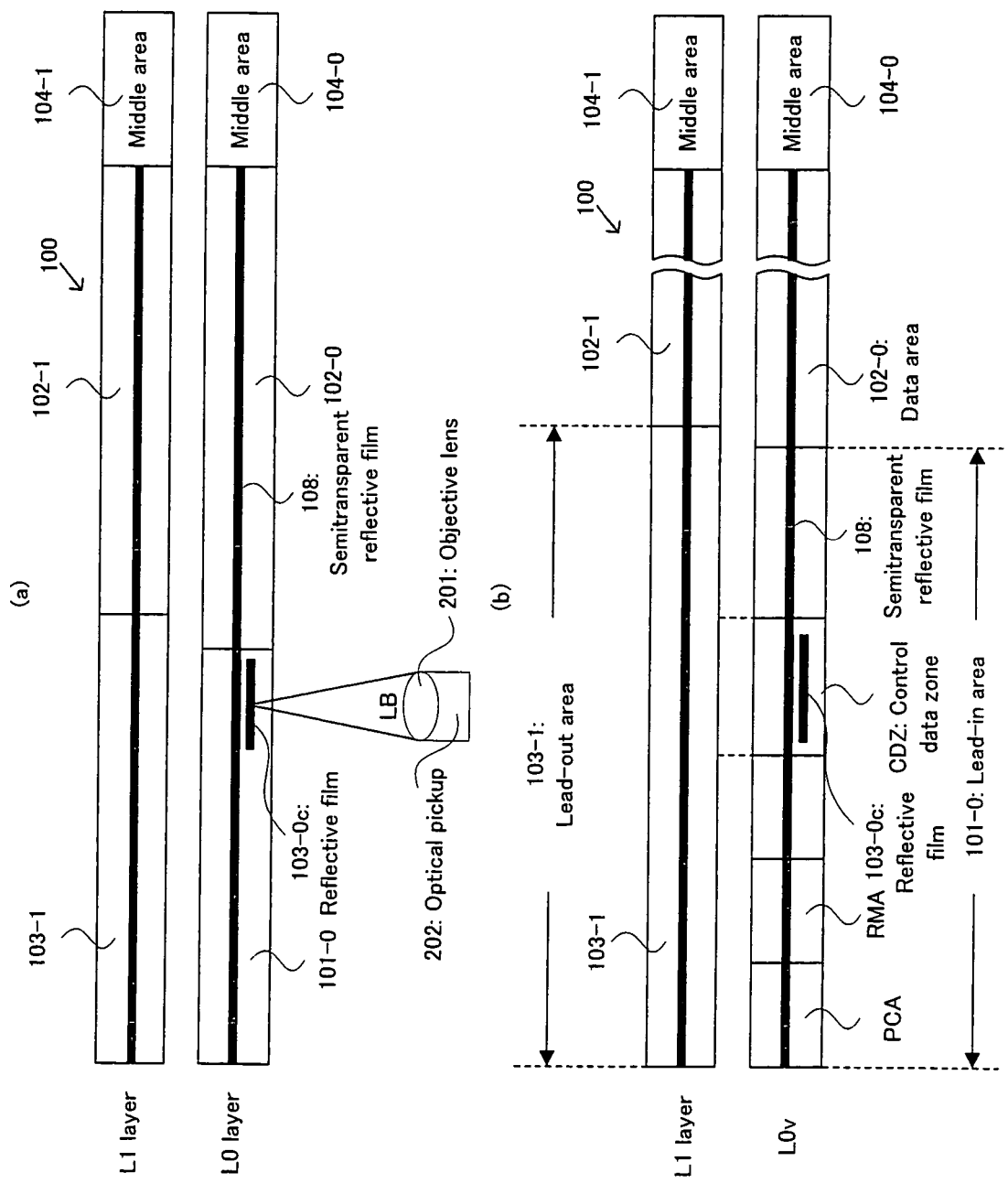

[FIG. 15]
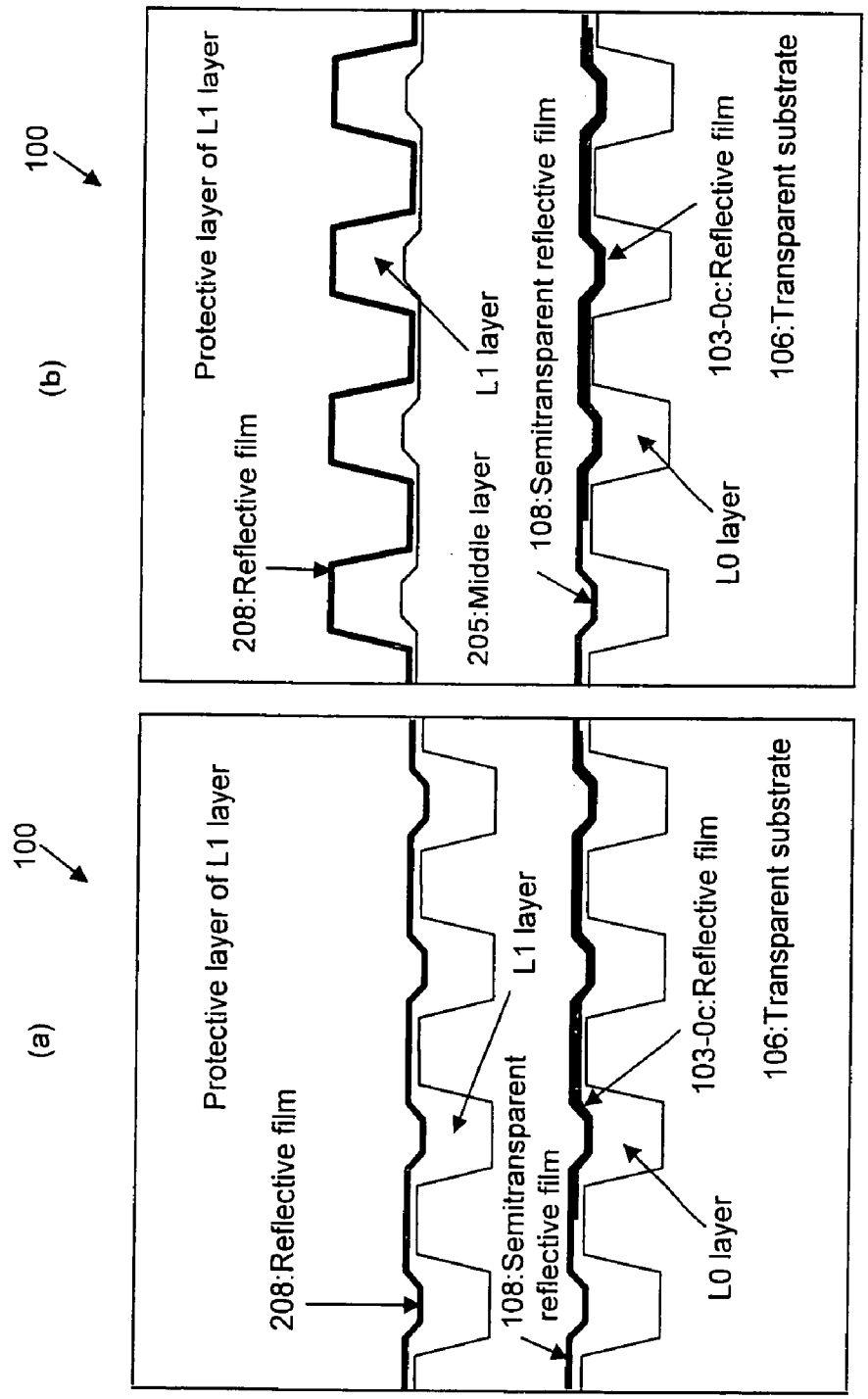

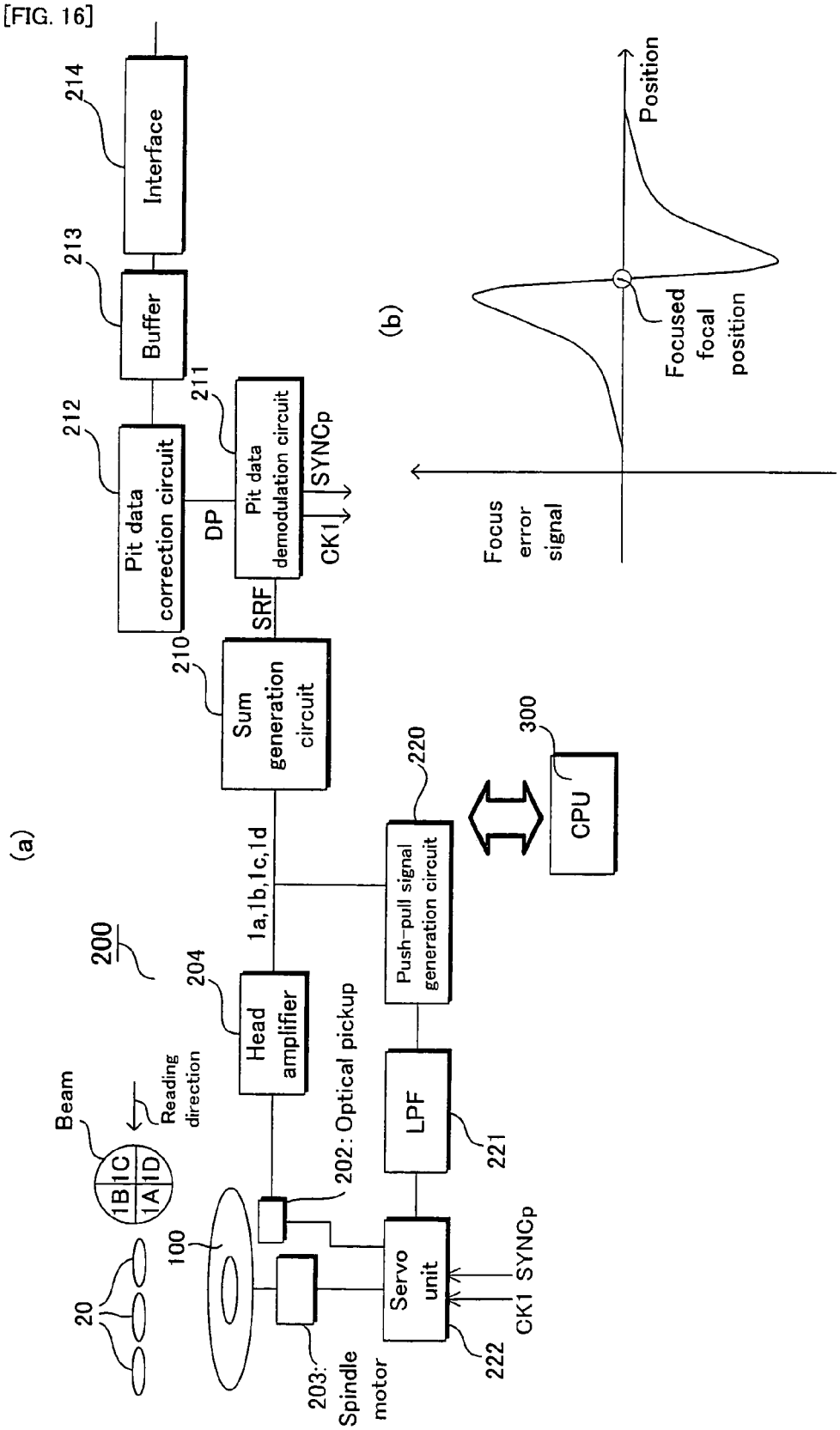
[FIG. 16]

INFORMATION RECORDING MEDIUM

TECHNICAL FIELD

The present invention relates to an information recording medium, such as a DVD.

BACKGROUND ART

In an information recording medium, such as a CD and a DVD, for example, as described in patent documents 1 and 2 or the like, there is also developed an information recording medium, such as an optical disc of a multilayer type or dual layer type or multiple layer type, in which a plurality of recording layers are laminated or stacked on the same substrate. Then, on an information recording apparatus, such as a CD recorder, for performing the recording with respect to the dual layer type, i.e., two-layer type, optical disc, laser light for recording is focused or condensed on a recording layer located on the front as viewed from the irradiation side of the laser light (hereinafter referred to as an "L0 layer", as occasion demands), to thereby record information into the L0 layer in an irreversible change recording method by heat or in a rewritable method. Moreover, the laser light is focused or condensed on a recording layer located on the rear of the L0 layer as viewed from the irradiation side of the laser light (hereinafter referred to as an "L1 layer", as occasion demands), through the L0 layer or the like, to thereby record information into the L1 layer in the irreversible change recording method by heat or the rewritable method.

On the other hand, there is also disclosed a technology of performing the recording or reproduction in an "opposite method" or the like with respect to the L0 layer and the L1 layer. The "opposite method" herein is a recording or reproduction method in which the directions of track paths are opposite between the two recording layers, for example.

Focus leading into the information recorded in each recording layer of the two-layer type optical disc is realized by the control of focus servo. More specifically, if an objective lens in an optical pickup is displaced in a direction of approaching the optical disc, in the case where the L0 layer is focused on, the focus error signal of reflected light from, e.g., a semitransparent reflective film of the L0 layer converges on "0". Moreover, if the objective lens is raised up and displaced in the direction of approaching the optical disc, in the case where the L1 layer is focused on, the focus error signal of reflected light from a reflective film of the L1 layer converges on "0". As described above, if the objective lens is displaced in the direction of approaching the optical disc, two focus error signals with an S-shaped waveform (hereinafter referred to as "S-shaped signals") are obtained, which are centered on the position of the objective lens when the L0 layer is focused on (hereinafter referred to as a "focused focal position" of the L0 layer, as occasion demands) and centered on the focused focal position of the L1 layer. It is possible to focus on each of the L0 layer and the L1 layer, by displacing the position of the objective lens up and down, under the control of focus servo using the two S-shaped signals.

Moreover, as described in a patent document 3, there is also a technology in which management information or the like is recorded only in a certain recording layer out of the plurality of recording layers. Furthermore, as described in a patent document 4, there is also a technology in which the plurality of recording layers are disposed without overlapped each other.

Patent document 1: Japanese Patent Application Laid Open NO. 2000-311346
Patent document 2: Japanese Patent Application Laid Open NO. 2001-23237
Patent document 3: Japanese Patent Application Laid Open NO. 2003-168221
Patent document 4: Japanese Patent Application Laid Open NO. Hei 9-147415

DISCLOSURE OF INVENTION

Subject to be Solved by the Invention

However, in such an optical disc, in the case where it is desired to focus the laser light on a desired recording layer out of the plurality of recording layers, the laser light is sometimes focused on a recording layer different from the desired recording layer. In particular, it is highly possible that the different recording layer is focused on, during an operation of reading the management information immediately after the optical disc is inserted in a player, a recorder, or the like. Namely, the S-shaped signal of the L1 layer is misidentified as the S-shaped signal of the L0 layer. In this case, there is such a technical problem that the optical pickup obtains address information, such as a sector number, of the L1 layer and misidentifies it as the address information of the L0 layer, to thereby malfunction, such as running out of control and bumping into a stopper on the inner circumferential side of the optical disc.

In order to solve the above-mentioned conventional problem, it is therefore an object of the present invention to provide an information recording medium, on which the information can be properly recorded onto the information recording medium having a plurality of recording layers and the recorded data can be reproduced.

Means for Solving the Subject

In order to solve the above object of the present invention, an information recording medium according to claim 1 of the present invention is provided with: a first recording layer in which a first recording track path to record therein record information is formed; and a second recording layer which is laminated on the first recording layer and in which a second recording tack path to record therein the record information is formed in a direction opposite to the first recording track path, in one recording layer of the first and second recording layers, a predetermined area in which focus leading of laser light is performed reflecting the laser light, in the other recording layer of the first and second recording layers, a facing area which faces the predetermined area not reflecting the laser light.

BRIEF DESCRIPTION OF DRAWINGS

FIG. 1 are a substantial plan view showing the basic structure of an optical disc having a plurality of recording areas in a first example of the information recording medium of the present invention (FIG. 1(a)), and a schematic cross sectional view of the optical disc and a corresponding conceptual diagram showing a recording area structure in the radial direction (FIG. 1(b)).

FIG. 2 is a partially enlarged perspective view showing the recording surface of the optical disc in the first example of the information recording medium of the present invention.

FIG. 3 is a conceptual graph showing the data structure of the two-layer type optical disc in the first example of the information recording medium of the present invention, a physical sector number constituting an ECC block in the recording areas of the optical disc, and a recording or reproducing method by an opposite method of the optical disc.

FIG. 4 are a schematic data structure diagram showing the data structure of the two-layer type optical disc in the first example of the information recording medium of the present invention (FIG. 4(a)) and an enlarged diagram thereof (FIG. 4(b)).

FIG. 5 are a schematic structure diagram showing a physical structure in the case where an L1 layer film is further formed on an L0 layer film which is formed on a transparent substrate of the two-layer type optical disc in the first example of the information recording medium of the present invention (FIG. 5(a)) and a schematic structure diagram showing a physical structure in the case where the L0 layer and the L1 layer are pasted after each of the films is formed on a different substrate (FIG. 5(b)).

FIG. 6 are a schematic data structure diagram showing the data structure of the two-layer type optical disc in a comparison example (FIG. 6(a)) and an enlarged diagram thereof (FIG. 6(b)).

FIG. 7 are a schematic structure diagram showing a physical structure in the case where the L1 layer film is further formed on the L0 layer film which is formed on the transparent substrate of the two-layer type optical disc in the comparison example (FIG. 7(a)) and a schematic structure diagram showing a physical structure in the case where the L0 layer and the L1 layer are pasted after each of the films is formed on a different substrate (FIG. 7(b)).

FIG. 8 are a data structure diagram showing the data structure of the two-layer type optical disc in a second example of the information recording medium of the present invention (FIG. 8(a)) and an enlarged diagram thereof (FIG. 8(b)).

FIG. 9 are a schematic structure diagram showing a physical structure in the case where the L1 layer film is further formed on the L0 layer film which is formed on the transparent substrate of the two-layer type optical disc in the second example of the information recording medium of the present invention (FIG. 9(a)) and a schematic structure diagram showing a physical structure in the case where the L0 layer and the L1 layer are pasted after each of the films is formed on a different substrate (FIG. 9(b)).

FIG. 10 are a data structure diagram showing the data structure of the two-layer type optical disc in a third example of the information recording medium of the present invention (FIG. 10(a)) and an enlarged diagram thereof (FIG. 10(b)).

FIG. 11 are a schematic structure diagram showing a physical structure in the case where the L1 layer film is further formed on the L0 layer film which is formed on the transparent substrate of the two-layer type optical disc in the third example of the information recording medium of the present invention (FIG. 11(a)) and a schematic structure diagram showing a physical structure in the case where the L0 layer and the L1 layer are pasted after each of the films is formed on a different substrate (FIG. 11(b)).

FIG. 12 are a data structure diagram showing the data structure of the two-layer type optical disc in a fourth example of the information recording medium of the present invention (FIG. 11(a)) and an enlarged diagram thereof (FIG. 11(b)).

FIG. 13 are a schematic structure diagram showing a physical structure in the case where the L1 layer film is further formed on the L0 layer film which is formed on the transparent substrate of the two-layer type optical disc in the fourth example of the information recording medium of the present invention (FIG. 13(a)) and a schematic structure diagram showing a physical structure in the case where the L0 layer and the L1 layer are pasted after each of the films is formed on a different substrate (FIG. 13(b)).

FIG. 14 are a data structure diagram showing the data structure of the two-layer type optical disc in a fifth example of the information recording medium of the present invention (FIG. 14(a)) and an enlarged diagram thereof (FIG. 14(b)).

FIG. 15 are a schematic structure diagram showing a physical structure in the case where the L1 layer film is further formed on the L0 layer film which is formed on the transparent substrate of the two-layer type optical disc in the fifth example of the information recording medium of the present invention (FIG. 15(a)) and a schematic structure diagram showing a physical structure in the case where the L0 layer and the L1 layer are pasted after each of the films is formed on a different substrate (FIG. 15(b)).

FIG. 16 are a block diagram showing the entire structure of an information reproducing apparatus for the optical disc in the examples of the present invention (FIG. 16(a)) and a graph showing one example of a focus error signal in the examples of the present invention.

DESCRIPTION OF REFERENCE CODES

1 . . . center hole, 10 . . . track, 11 . . . ECC block, 20 . . . record mark, 100 . . . optical disc, 101-0 (101-1) . . . lead-in area, 102-0 (102-1) . . . data area, 103-0 (103-1) . . . lead-out area, 103-0a . . . semitransparent reflective film lacking portion, 103-1a . . . reflective film lacking portion, 103-1b . . . light absorption or light scattering film, 104-0 (104-1) . . . middle area, 106 . . . transparent substrate, 107 . . . first recording layer, 109 . . wobble, 108 . . . semitransparent reflective film, 205 . . . middle layer, 207 . . . second recording layer, 208 . . . reflective film, 200 . . . information reproducing apparatus, 201 . . . objective lens, 202 . . . optical pickup, 203 . . . spindle motor, 204 . . . head amplifier, 210 . . . sum generation circuit, 211 . . . pit data demodulation circuit, 212 . . . pit data correction circuit, 213 . . . buffer, 214 . . . interface, 220 . . . push-pull signal generation circuit, 221 . . . low pass filter, 222 . . . servo unit, 300 . . . CPU, GT . . . groove track, LT . . . land track, LB . . . laser light, LP . . . land pre-pit, CDZ . . . control data zone

BEST MODE FOR CARRYING OUT THE INVENTION

Embodiment of Information Recording Medium

Hereinafter, the information recording medium in the embodiment of the present invention will be explained.

The embodiment according to an information recording medium of the present invention is provided with: a first recording layer in which a first recording track path to record therein record information is formed; and a second recording layer which is laminated on the first recording layer and in which a second recording tack path to record therein the record information is formed in a direction opposite to the first recording track path, in one recording layer of the first and second recording layers, a predetermined area in which focus leading of laser light is performed reflecting the laser light, in the other recording layer of the first and second recording layers, a facing area which faces the predetermined area not reflecting the laser light.

According to the embodiment of the information recording medium of the present invention, the first and second recording layers are laminated on one side of a disc-shaped substrate, and it is a DVD or an optical disc of a two-layer type or multilayer type, for example. In the first recording layer, the address information, such as a sector number, is readably recorded, and the record information, such as audio, video information, and content information, can be recorded along the first recording track path. In the second recording layer, the address information, such as a sector number, appended in a direction different from that of the address information of the first recording layer is readably recorded, and the record information, such as audio, video information, and content information, can be recorded along the second recording track path. By virtue of such construction, the laser light for recording or reproduction is irradiated in the order of the substrate, the first recording layer, and the second recording layer.

Particularly, the first recording track path is directed from one side to the other side, out of the inner and outer circumferential sides of the disc-shaped substrate, for example. In contrast, the second recording track path is directed from the other side to the one side. Namely, in the two-layer type or multilayer type information recording medium, continuous recording is possible by the "opposite method" in which the track paths are directed in the opposite direction between the two recording layers. Therefore, if the recording is continuously performed from the end edge of the first recording layer (e.g. the end portion on the outer circumferential side) to the start edge of the second recording layer (e.g. the end portion on the outer circumferential side), it is hardly necessary or not necessary at all to change the irradiation position of the laser light in the substrate surface in the radial direction, in changing the recording layer as the target of a recording process or reproduction process related to the record information. Thus, it is possible to perform quick layer jump (i.e. a layer changing operation). This is extremely useful in practice, in the point that it facilitates uninterrupted reproduction without a special buffer function to change the recording layer, when the continuous record information, such as a movie, for example, is recorded.

Particularly in the embodiment, in one recording layer of the first and second recording layers, the management information, such as control data, for recording or reproduction in which focus leading is firstly performed upon the recording or reproduction, is recorded in the predetermined area, such as a control data zone, for example. The focus leading herein is that the first recording layer or the second recording layer is focused on by an optical pickup in order to obtain the management information for recording or reproduction, when the information recording medium is inserted or the like. Moreover, in the other recording layer of the first and second recording layers, it is constructed such that in the facing area which faces the predetermined area, light is not emitted, i.e. not reflected, according to the laser light for recording or reproduction.

Specifically, in the facing area of the second recording layer which faces the predetermined area, such as the control data zone, of the desired first recording layer, if it is constructed such that light is transmitted, absorbed or scattered due to the lack of a reflective film or the like, the light is not reflected, i.e., not emitted, depending on the laser light for recording or reproduction. By this, the light from the optical pickup is not focused on the second recording layer but can be focused on the desired first recording layer. Thus, it is possible to certainly and quickly obtain the management information recorded in the control data zone or the like of the desired first recording layer, for example.

More specifically, it is possible to focus on the first recording layer, by displacing the position of the objective lens in the optical pickup up and down, under the control of focus servo using one S-shaped signal in the desired first recording layer. Thus, it is possible to certainly and quickly realize access to the management information such as a book type or the like, recorded in the predetermined area, such as the control data zone, of the first recording layer. The reason is as follows. At first, if the objective lens in the optical pickup is displaced in a direction of approaching the optical disc, only one S-shaped signal is obtained which is centered on the focused focal position at which the focus error signal of reflected light from a semitransparent reflective film of the first recording layer converges on "0". Even if the objective lens is further raised up and displaced in the direction of approaching the optical disc, the light transmitted through the semitransparent reflective film of the first recording layer is also transmitted through the facing area where the reflective film is lacking of the second recording layer as it is, that is, the light is not reflected in the second recording layer. Thus, the S-shaped signal does not appear in the second recording layer, and the second recording layer is hardly focused on or not focused on at all.

If it is constructed such that the light is emitted depending on the laser light in both the predetermined area and the facing areas of the first and second recording layers, it may be possible to focus on each of the first and the second recording layers, by displacing the position of the objective lens up and down, under the control of focus servo using two S-shaped signals in the first and second recording layers.

However, in this type of optical disc, in the case where it is desired to focus the laser light on a desired recording layer out of the plurality of recording layers, the laser light is sometimes focused on a different recording layer from the desired recording layer. In particular, it is highly possible that the different recording layer is focused on, during an operation of reading the management information immediately after the optical disc is inserted in a player, a recorder, or the like. Namely, the S-shaped signal of the second recording layer is misidentified as the S-shaped signal of the first recording layer. In this case, the optical pickup obtains the address information, such as the sector number, of the second recording layer and misidentifies it as the address information of the first recording layer, to thereby malfunction (or error function), such as running out of control and bumping into a stopper on the inner circumferential side of the optical disc. In contrast, in the embodiment, it is possible to focus on the desired recording layer, by displacing the position of the objective lens in the optical pickup up and down, under the control of focus servo using one S-shaped signal in the desired recording layer. Thus, it is possible to certainly and quickly realize access to the management information such as a book type or the like, recorded in the control data zone, of the desired recording layer.

In one aspect of the embodiment of the information recording medium of the present invention, a reflective film corresponding to the facing area is lacking in the other recording layer.

According to this aspect, at first, if the objective lens in the optical pickup is displaced in a direction of approaching the optical disc, only one S-shaped signal is obtained which is centered on the focused focal position at which the focus error signal of the reflected light from the semitransparent reflective film of the desired first recording layer converges on "0". Even if the objective lens is further raised up and displaced in the direction of approaching the optical disc, the light transmitted through the semitransparent reflective film of the first recording layer is also transmitted through the facing area where the reflective film is lacking of the second recording layer as it is, that is, the light is not reflected in the second recording layer. Thus, the S-shaped signal does not appear in the second recording layer, and the second recording layer is hardly focused on or not focused on at all.

Accordingly, it is possible to certainly and quickly realize access to the management information such as a book type or the like, recorded in the predetermined area, such as the control data zone, of the desired recording layer.

In another aspect of the embodiment of the information recording medium of the present invention, a light absorption or light scattering film is disposed in a portion corresponding to the facing area in the other recording layer.

According to this aspect, at first, if the objective lens in the optical pickup is displaced in a direction of approaching the optical disc, only one S-shaped signal is obtained which is centered on the focused focal position at which the focus error signal of the reflected light from the semitransparent reflective film of the desired first recording layer converges on "0". Even if the objective lens is further raised up and displaced in the direction of approaching the optical disc, the laser light transmitted through the semitransparent reflective film of the first recording layer is absorbed or scattered by the light absorption or light scattering film of the second recording layer, that is, the laser light is not reflected in the second recording layer. Thus, the S-shaped signal does not appear in the second recording layer, and the second recording layer is hardly focused on or not focused on at all.

Accordingly, it is possible to certainly and quickly realize access to the management information such as a book type or the like, recorded in the predetermined area, such as the control data zone, of the desired recording layer.

In another aspect of the embodiment of the information recording medium of the present invention, the one recording layer is disposed closer to a side where the laser light is irradiated than to the other recording layer, and the light absorption or light scattering film is disposed on a side of the facing area in a portion corresponding to the predetermined area or a portion of the predetermined area.

According to this aspect, at first, if the objective lens in the optical pickup is displaced in a direction of approaching the optical disc, only one S-shaped signal is obtained which is centered on the focused focal position at which the focus error signal of the reflected light from the semitransparent reflective film of the desired first recording layer converges on "0". Even if the objective lens is further raised up and displaced in the direction of approaching the optical disc, the laser light LB transmitted through the semitransparent reflective film of the first recording layer is absorbed or scattered by the light absorption or light scattering film which is formed on the semitransparent reflective film of the first recording layer by the side of the second recording layer, that is, the laser light is not reflected in the second recording layer. Thus, the S-shaped signal does not appear in the second recording layer, and the second recording layer is hardly focused on or not focused on at all.

Accordingly, it is possible to certainly and quickly realize access to the management information such as a book type or the like, recorded in the predetermined area, such as the control data zone, of the desired first recording layer.

In another aspect of the embodiment of the information recording medium of the present invention, the one recording layer is disposed closer to a side where the laser light is irradiated than to the other recording layer, and a whole reflective film is disposed in a portion corresponding to the predetermined area or a portion of the predetermined area.

According to this aspect, at first, if the objective lens in the optical pickup is displaced in a direction of approaching the optical disc, only one S-shaped signal is obtained which is centered on the focused focal position at which the focus error signal of the reflected light from the entire or whole reflective film of the desired first recording layer converges on "0". Even if the objective lens is further raised up and displaced in the direction of approaching the optical disc, the laser light reflected by the entire or whole reflective film of the first recording layer is obviously not transmitted through the first recording layer nor reflected in the second recording layer. Thus, the S-shaped signal does not appear in the second recording layer, and the second recording layer is hardly focused on or not focused on at all.

Accordingly, it is possible to certainly and quickly realize access to the management information such as a book type or the like, recorded in the predetermined area, such as the control data zone, of the desired first recording layer.

In another aspect of the embodiment of the information recording medium of the present invention, the predetermined area is an area of a lead-in area in which control data is recorded, and the facing area is a partial area of a lead-out area.

According to this aspect, the predetermined area where the management information, such as control data, is recorded is located in the lead-in area of the desired first recording layer, and the facing area which faces the predetermined area is located in the lead-out area of the second recording layer.

Accordingly, it is possible to certainly and quickly realize access to the management information such as a book type or the like, recorded in the predetermined area, such as the control data zone formed by embosses or the like, located in the lead-in area of the desired first recording layer, when the information recording medium is inserted or the like.

These effects and other advantages of the present invention become more apparent from the following examples.

As explained above, according to the embodiment of the information recording medium of the present invention, it is provided with: the first recording layer; and the second recording layer, in one recording layer of the first and second recording layers, a predetermined area reflecting the laser light, in the other recording layer, a facing area not reflecting the laser light. Thus, it is possible to properly record the information onto the information recording medium having a plurality of recording layers and to reproduce the recorded data, for example.

EXAMPLES

First Example of Information Recording Medium

Next, with reference to FIGS. 1 to FIGS. 7, the first example of the information recording medium of the present invention will be discussed in detail, on the basis of the drawings.

At first, with reference to FIG. 1, the basic structure of an optical disc in the first example of the recording medium of the present invention will be discussed. FIG. 1($a$) is a substantial plan view showing the basic structure of an optical disc having a plurality of recording areas in the first example of the information recording medium of the present invention, and FIG. 1($b$) is a schematic cross sectional view of the optical disc and a corresponding conceptual diagram showing a recording area structure in the radial direction.

As shown in FIG. 1($a$) and FIG. 1($b$), an optical disc 100 has a recording surface on a disc main body with a diameter of about 12 cm, as is a DVD. On the recording surface, the optical disc 100 is provided with: a lead-in area 101; a data area 102; and a lead-out area 103 or a middle area 104, related to the example, centered on a center hole 101. Then, for example, on a transparent substrate 106 of the optical disc 100, there are laminated recording layers and the like. In each recording area of the recording layers, a track or tracks 10, such as a groove track and a land track, are alternately placed, spirally or concentrically, with the center hole 101 as the center. On the track 10, data is divided and recorded by a unit of ECC block 11. The ECC block 11 is a data management unit by a pre-format address in which record information is error-correctable.

Incidentally, the present invention is not particularly limited to the optical disc having these three areas. For example, even if the lead-in area 101, the lead-out area 103 or the middle area 104 does not exist, a data structure explained below can be constructed. Moreover, as described later, the lead-in area 101, the lead-out area 103 or the middle area 104 may be further segmentized.

Particularly, the optical disc 100 in the example, as shown in FIG. 1(b), has such a structure that an L0 layer which constitute one example of the "first recording layer" of the present invention and an L1 layer which constitute one example of the "second record layers" of the present invention are laminated on the transparent substrate 106, for example. Upon the recording/reproduction of such a two-layer type optical disc 100, the recording/reproduction in the L0 layer or the L1 layer is performed, depending on which recording layer has the focus position of laser light LB, irradiated from the upper to the lower side in FIG. 1(b). Moreover, the optical disc 100 in the example is not limited to a two-layer single sided type, i.e., a dual layer type, but may be a two-layer double sided type, i.e., a dual layer double sided type. Furthermore, the optical disc 100 in the example is not limited to the optical disc having the two recording layers, as described above, but may be an optical disc of a multilayer type which has three or more layers.

Incidentally, a recording/reproducing procedure by the opposite method on the two-layer type optical disc and the data structure of each layer will be described later.

Next, with reference to FIG. 2, an outline of the physical structure of the optical disc in the first example of the information recording medium of the present invention will be discussed in more details. More specifically, the optical disc 100 in the first example is constructed as a two-layer type optical disc on which a plurality of data zones 102 or the like are formed in a lamination structure, for example. FIG. 2 is a partially enlarged perspective view showing the recording surface of the optical disc in the first example of the information recording medium of the present invention.

As shown in FIG. 2, in the first example, the optical disc 100 has a first recording layer 107 of a phase change type or of an irreversible change recording type by heat or the like, which constitutes an information recording surface, laminated on (on the lower side of, in FIG. 2) the disc-shaped transparent substrate 106, and further has a semitransparent reflective film 108 thereon (on the lower side thereof in FIG. 2). On the information recording surface constructed from the surface of the first recording layer 107, the groove track GT and the land track LT are alternately formed. Incidentally, upon recording and reproduction of the optical disc 100, for example, as shown in FIG. 2, the groove track GT is irradiated with the laser light LB through the transparent substrate 106. For example, upon recording, the laser light LB is irradiated with a recording laser power, to thereby perform the writing by a phase change or the irreversible change recording by heat or the like, with respect to the first recording layer 107. On the other hand, upon reproduction, the laser light LB is irradiated with a reproduction laser power weaker than the recording laser power, by which the record data written in the first recording layer 107 is read.

In the first example, the groove track GT is oscillated with a constant amplitude and at a constant spatial frequency. In other words, the groove track GT is wobbled, and the cycle of the wobble 109 is set to a predetermined value. On the land track LT, there is formed an address pit which is referred to as a land pre-pit LP and which indicates pre-format address information. By virtue of the two addressing (i.e. the wobble 109 and the land pre-pit LP), it is possible to obtain information necessary for disc rotation control during the recording, generation of a recording clock, or data recording, such as a recording address. Incidentally, it is also possible to record the pre-format address in advance, by modulating the wobble 109 of the groove track GT in a predetermined modulation method, such as frequency modulation and phase modulation.

Particularly in the first example, a second recording layer 207 is formed on (on the lower side of, in FIG. 2) the semitransparent reflective film 108, and moreover, a reflective film 208 is formed thereon (on the lower side thereof, in FIG. 2). The second recording layer 207 is constructed such that the recording and reproduction of the phase change type or of the irreversible change recording type by heat or the like can be performed in substantially the same manner as the first recording layer 107, by irradiating the laser light LB through the transparent substrate 106, the first recording layer 107, and the semitransparent reflective film 108. With regard to the second recording layer 207 and the reflective film 208, they may be laminated, i.e. film-formed, on the transparent substrate 106 on which the first recording layer 107 and the semitransparent reflective film 108 or the like are formed. Alternatively, after each of them is laminated, i.e. film-formed, on a different substrate, they may be pasted to the transparent substrate 106. Incidentally, between the semitransparent reflective film 108 and the second recording layer 207, there is provided a transparent middle layer 205 constructed from a transparent adhesive or the like, as occasion demands, according to the manufacturing method.

Upon the recording and reproduction of such a two-layer type optical disc 100, the recording and reproduction in the first recording layer 107 or the second recording layer 207 is performed, depending on which recording layer has the focus position of the laser light LB, that is, which recording layer is focused on.

Next, with reference to FIG. 3, an explanation will be given for the data structure of the two-layer type optical disc in the first example of the information recording medium of the present invention, a physical sector number constituting an ECC block in the recording areas of the optical disc, and a recording or reproducing method by an opposite method of the optical disc. Here, the physical sector number (hereinafter referred to as a sector number, as occasion demands) is position information which indicates an absolute physical address in the recording area of the optical disc. FIG. 3 is a conceptual graph showing the data structure of the two-layer type optical disc in the first example of the information recording medium of the present invention, the physical sector number constituting an ECC block in the recording areas of the optical disc, and the recording or reproducing method by an opposite method of the optical disc. The vertical axis indicates the sector number by hexadecimal numeral, and the horizontal axis indicates a relative position in the radial direction of the optical disc.

As shown in FIG. 3, the two-layer type optical disc 100 in the first example of the information recording medium of the present invention is provided with: the above-mentioned transparent substrate; and two recording layers laminated on the substrate, i.e. an L0 layer (i.e. a recording layer corresponding to the first recording layer 107 in the present invention in FIG. 2) and an L1 layer (i.e. a recording layer corresponding to the second recording layer 207 in the present invention in FIG. 2) (Incidentally, FIG. 3 shows up-down reversal of position, as compared to FIG. 1(b) and FIG. 2, for convenience of explanation). Specifically, the L0 layer is provided with: a lead-in area 101-0; a data area 102-0; and a middle area 104-0, from the inner to the outer circumferential side. The lead-in area 101-0 is provided with: a PC (Power Calibration) area for an OPC (Optimum Power Calibration) process; and a control data zone CDZ constituting one example of the predetermined area in the present invention in which the management information or the like is recorded.

On the other hand, the L1 layer is provided with: a middle area 104-1; a data area 102-1; and a lead-out area 103-1, from the outer to the inner circumferential side. The lead-out area 103-1 may be also provided with a not-illustrated OPC area or the like.

The optical disc 100 is constructed in the above manner, so that the laser light LB is irradiated from the side of the above-mentioned transparent substrate, i.e., from the lower to the upper side in FIG. 3, by a not-illustrated optical pickup in the recording or reproduction of the optical disc 100, and the focal distance thereof or the like is controlled. At the same time, the travel distance and direction in the radial direction of the optical disc 100 are controlled. By this, the data is recorded into each recording layer, or the recorded data is reproduced.

In particular, the opposite method is adopted in the recording or reproduction procedure for the two-layer type optical disc in the first example of the information recording medium of the present invention. The opposite method herein is, more specifically, such a method that as the recording or reproduction procedure for the two-layer type optical disc, the optical pickup of an information recording/reproducing apparatus described later is displaced from the inner to the outer circumferential side, i.e. in a direction of a right-pointing arrow in FIG. 3, in the L0 layer, while the optical pickup is displaced from the outer to the inner circumferential side, i.e. in a direction of a left-pointing arrow in FIG. 3, in the L1 layer, to thereby perform the recording or reproduction on the two-layer type optical disc. In the opposite method, if the recording or reproduction is ended in the L0 layer, the optical pickup, located on the most outer circumference of the optical disc, does not have to be displaced again to the most inner circumference when the recording or reproduction is started in the L1 layer, and it is only necessary to change the focal distance from the L0 layer to the L1 layer. Thus, there is an advantage that a changing time from the L0 layer to the L1 layer is shorter than that in the parallel method which is a recording or reproducing method in which the track path direction is the same between the two recording layers. This is why the opposite method is adopted for the recording of a large-volume of content information.

Specifically, at first, in the L0 layer, as the optical pickup is displaced in the lead-in area 101-0, the data area 102-0, and the middle area 104-0, from the inner to the outer circumferential side, the sector number in the recording area of the optical disc 100 increases. More specifically, the optical pickup sequentially accesses the end position of the lead-in area 101-0 with a sector number of "02FFFFh" (refer to an A point in FIG. 3), the start position of the data area 102-0 with a sector number of "030000h" (refer to a B point in FIG. 3), and the end position of the data area 102-0 with a sector number of "1AFFFFh" (hereinafter referred to as a "turn-around point" in the L0 layer, as occasion demands: refer to a C point in FIG. 3), and the optical pickup is displaced to the middle area 104-0 which functions as the buffer. By this, the recording or reproduction is performed in the L0 layer. Incidentally, "h" at the tail of "30000h" or the like in the example indicates that it is expressed by hexadecimal numeral.

On the other hand, in the L1 layer, specifically, as the optical pickup is displaced in the middle area 104-1, the data area 102-1, and the lead-out area 103-1 from the outer to the inner circumferential side, the sector number in the recording area of the optical disc 100 increases. More specifically, the optical pickup sequentially accesses the middle area 104-1 which functions as the buffer, the start position of the data area 102-1 with a sector number of "E50000h" (hereinafter referred to as a "turn-around point" in the L1 layer, as occasion demands: refer to a D point in FIG. 3), and the end position of the data area 102-1 with a sector number of "FCFFEFh" (refer to an E point in FIG. 3), and the optical pickup is displaced to the lead-out area 103-1. By this, the recording or reproduction is performed in the L1 layer.

All the sector numbers in the L0 layer and the L1 layer explained above have a 15's complement number relationship in the hexadecimal numeral. More specifically, the turn-around point in the L0 layer (the sector number of "1AFFFFh") and the turn-around point in the L1 layer (the sector number of "E50000h") have the 15's complement number relationship. As a formal matter, the complement number of the "1AFFFFh" is obtained by converting the sector number of "1AFFFFh" in the hexadecimal numeral to a binary number of "000110101111111111111111", inverting the bits to "111001010000000000000000", and reconverting it to the "E50000h" in the hexadecimal numeral. Thus, the content information is recorded or reproduced at the same time that the optical pickup is continuously displaced in the sector numbers "030000h" to "1AFFFFh" of the data area 102-0 in the L0 layer and in the sector numbers "E50000h" to "FCFFEFh" of the data area 102-1 in the L1 layer, for example.

With respect to the physical sector number explained above, a LBA (Logical Block Address) is allocated in a one-to-one manner. More specifically, "000000" LBA corresponds to the sector number "030000h", and "30FFFF" LBA corresponds to the sector number "FCFFEFh".

Next, with reference to FIGS. 4 and FIGS. 5, a detailed explanation will be given for the data structure of the two-layer type optical disc in the first example of the information recording medium of the present invention, the physical structure thereof, and a method of focusing on a desired recording layer upon the recording or reproduction of the optical disc. FIG. 4 are a schematic data structure diagram showing the data structure of the two-layer type optical disc in the first example of the information recording medium of the present invention (FIG. 4(a)) and an enlarged diagram thereof (FIG. 4(b)). Incidentally, the laser light LB emitted from a not-illustrated semiconductor laser in an optical pickup 202 is focused by an objective lens 201, onto or toward the L0 layer and the L1 layer, in FIG. 4. FIG. 5 are a schematic structure diagram showing a physical structure in the case where the L1 layer film is further formed on the L0 layer film which is formed on a transparent substrate of the two-layer type optical disc in the first example of the information recording medium of the present invention (FIG. 5(a)) and a schematic structure diagram showing a physical structure in the case where the L0 layer and the L1 layer are pasted after each of the films is formed on a different substrate (FIG. 5(b)).

With regard to the data structure of the two-layer type optical disc in the first example of the information recording medium of the present invention, the explanation thereof is the same as that in the above-mentioned FIG. 3, so that it is omitted.

In particular, as shown in FIGS. 4 and FIGS. 5, in the two-layer type optical disc in the first example of the information recording medium of the present invention, the reflective film 208 is lacking in a reflective film lacking portion 103-1a of the L1 layer facing or opposed to the control data zone CDZ of the L0 layer. By this, the laser light LB from the optical pickup can be focused not on the L1 layer but on the L0 layer, so that it is possible to obtain the management information recorded in the control data zone CDZ of the L0 layer, certainly and quickly.

More specifically, it is possible to focus on the L0 layer, by displacing the position of the objective lens in the optical pickup up and down, under the control of focus servo using one S-shaped signal in the desired L0 layer. Thus, it is possible to certainly and quickly realize access to the management information such as a book type or the like, recorded in the control data zone CDZ of the L0 layer. The reason is as follows. At first, if the objective lens in the optical pickup is displaced in a direction of approaching the optical disc, only one S-shaped signal is obtained which is centered on the focused focal position at which the focus error signal of reflected light from the semitransparent reflective film 108 of the L0 layer converges on "0". Even if the objective lens is further raised up and displaced in the direction of approaching the optical disc, the laser light LB transmitted through the semitransparent reflective film 108 of the L0 layer is also transmitted through the reflective film lacking portion 103-1a of the L1 layer as it is, that is, the laser light LB is not reflected in the L1 layer. Thus, the S-shaped signal does not appear in the L1 layer, and the L1 layer is hardly focused on or not focused on at all.

Incidentally, even a not-illustrated two-layer type optical disc in the parallel method may adopt such construction that the reflective film 208 is lacking in the reflective film lacking portion 103-1a of the L1 layer facing the control data zone CDZ of the L0 layer. Even if it is constructed in this manner, it is possible to receive the same benefits as those of the optical disc in the above-mentioned example.

Next, with reference to FIGS. 6 and FIGS. 7, as well as the above-mentioned FIG. 3, if necessary, a study is made regarding the operation and the effect of the first example of the information recording medium of the present invention. FIG. 6 are a schematic data structure diagram showing the data structure of the two-layer type optical disc in a comparison example (FIG. 6(a)) and an enlarged diagram thereof (FIG. 6(b)). FIG. 7 are a schematic structure diagram showing a physical structure in the case where the L1 layer film is further formed on the L0 layer film which is formed on the transparent substrate of the two-layer type optical disc in the comparison example (FIG. 7(a)) and a schematic structure diagram showing a physical structure in the case where the L0 layer and the L1 layer are pasted after each of the films is formed on a different substrate (FIG. 7(b)).

With regard to the data structure of the two-layer type optical disc in the comparison example, the explanation thereof is the same as that in the above-mentioned FIG. 3, so that it is omitted. Moreover, even with regard to the physical structure of the optical disc, the explanation thereof is the same as that in the above-mentioned FIG. 2, so that it is omitted.

As shown in the above-mentioned FIG. 3 in addition to FIGS. 6 and FIGS. 7, in the optical disc 100 in the opposite method in the comparison example, the semitransparent reflective film 108 is laminated on the entire L0 layer, and the reflective film 208 is laminated on the entire L1 layer. Thus, immediately after the optical disc is inserted or loaded, another S-shaped signal centered on the focused focal position at which the focus error signal of reflected light from the reflective film 208 of the L1 layer converges on "0" is also obtained, in addition to the S-shaped signal centered on the focused focal position at which the focus error signal of the reflected light from the semitransparent reflective film 108 of the L0 layer converges on "0". If the control data zone CDZ of the L0 layer is irradiated with the laser light LB under the control of focus servo using the two S-shaped signals, there is a possibility that the laser light LB is focused on the L1 layer corresponding to the same radial position by mistake, due to some external or internal factors, such as oscillation or vibration from the exterior, for example.

In this case, because the information, such as the position information and the management information, can be read even in the L1 layer, an information recording/reproducing apparatus described later tends to recognize the position information, such as the sector number, for example, and tends to continue the recording or reproduction operation in the L1 layer. More specifically, under the control of the information recording/reproducing apparatus, the optical pickup searches for a sector number of "025000h" of the control data zone CDZ. Here, the laser light LB is mistakenly focused on the L1 layer, so that a sector number of "FDAFFF" (i.e., inverting of "025000h") of the L1 layer is accessed.

In the optical disc in the opposite method, as shown in the above-mentioned FIG. 3, the sector number in the L0 layer decreases as it reaches the inner circumferential side (i.e. the side of the lead-in area 101-0), while the sector number in the L1 layer increases as it reaches the inner circumferential side (i.e. the side of the lead-out area 103-1). Therefore, although the L1 layer is focused on, the optical pickup of the information recording/reproducing apparatus misidentifies that the L0 layer is focused on, and searches for the sector number "025000h" smaller than the target number, toward the inner circumferential side.

However, in the L1 layer, the sector number increases as it reaches the inner circumferential side, so that the information recording/reproducing apparatus displaces the optical pickup further to the inner circumferential side in order to search for a proper sector number. Thus, it continues this operation until the displacement of the optical pickup is limited by a stopper located on the most inner circumferential side in the end. Thus, there is a possibility that the management information recorded in a desired recording layer is not properly obtained. Such a situation is not preferable in the proper and quick operation of recording or reproducing the information. Therefore, even if the laser light is actually focused on the L1 layer, the information recording/reproducing apparatus sometimes recognizes that it is focused on the L0 layer. Thus, as described above, there is such a technical problem that it is hardly possible to properly obtain the management information for recording or reproduction, as originally intended.

In contrast, according to the optical disc in the first example explained with reference to FIGS. 1 to FIGS. 5, by constructing it such that the reflective film 208 is lacking in the reflective film lacking portion 103-1a of the L1 layer facing the control data zone CDZ of the L0 layer, it is possible to focus the laser light LB from the optical pickup not on the L1 layer but on the L0 layer, and it is also possible to certainly and quickly obtain the management information recorded in the control data zone CDZ of the L0 layer.

Second Example of Information Recording Medium

Next, with reference to FIGS. 8 to FIGS. 9, a detailed explanation will be given for the data structure of the two-layer type optical disc in the second example of the information recording medium of the present invention, the physical structure thereof, and the method of focusing on a desired recording layer upon the recording or reproduction of the optical disc. FIG. 8 are a data structure diagram showing the data structure of the two-layer type optical disc in the second example of the information recording medium of the present invention (FIG. 8(*a*)) and an enlarged diagram thereof (FIG. 8(*b*)). Incidentally, the laser light LB emitted from a not-illustrated semiconductor laser in the optical pickup 202 is focused by the objective lens 201, onto the L0 layer and the L1 layer, in FIG. 8, as in the above-mentioned FIG. 4. FIG. 9 are a schematic structure diagram showing a physical structure in the case where the L1 layer film is further formed on the L0 layer film which is formed on the transparent substrate of the two-layer type optical disc in the second example of the information recording medium of the present invention (FIG. 9(*a*)) and a schematic structure diagram showing a physical structure in the case where the L0 layer and the L1 layer are pasted after each of the films is formed on a different substrate (FIG. 9(*b*)).

The data structure and the physical structure of the two-layer type optical disc in the second example of the information recording medium of the present invention are substantially the same as those of the first example explained with reference to FIGS. 1 to FIGS. 7.

In particular, as shown in FIGS. 8 and FIGS. 9, in the two-layer type optical disc in the second example of the information recording medium of the present invention, the semitransparent reflective film 108 is lacking in a semitransparent reflective film lacking portion 103-0*a* of the L0 layer facing or opposed to the control data zone CDZ of the L1 layer. By this, the laser light LB from the optical pickup can be focused not on the L0 layer but on the L1 layer, so that it is possible to certainly and quickly obtain the management information recorded in the control data zone CDZ of the L1 layer.

More specifically, it is possible to focus on the L1 layer, by displacing the position of the objective lens in the optical pickup up and down, under the control of focus servo using one S-shaped signal in the desired L1 layer. Thus, it is possible to certainly and quickly realize access to the management information such as a book type or the like, recorded in the control data zone CDZ of the L1 layer. The reason is as follows. At first, if the objective lens in the optical pickup is displaced in a direction of approaching the optical disc, the laser light LB for recording or reproduction is transmitted through the semitransparent reflective film lacking portion 103-0*a* of the L0 layer, that is, the laser light LB is not reflected. Thus, the S-shaped signal does not appear in the L0 layer. If the objective lens is further raised up and displaced in the direction of approaching the optical disc, only one S-shaped signal is obtained which is centered on the focused focal position at which the focus error signal of the reflected light from the reflective film 208 of the L1 layer converges on "0". Thus, the L0 layer is hardly focused on or not focused on at all.

By this, even in the optical disc in the second example, it is possible to receive the same benefits as those of the optical disc in the first example.

Third Example of Information Recording Medium

Next, with reference to FIGS. 10 to FIGS. 11, a detailed explanation will be given for the data structure of the two-layer type optical disc in the third example of the information recording medium of the present invention, the physical structure thereof, and the method of focusing on a desired recording layer upon the recording or reproduction of the optical disc. FIG. 10 are a data structure diagram showing the data structure of the two-layer type optical disc in the third example of the information recording medium of the present invention (FIG. 10(*a*)) and an enlarged diagram thereof (FIG. 10(*b*)). Incidentally, the laser light LB emitted from a not-illustrated semiconductor laser in the optical pickup 202 is focused by the objective lens 201, onto the L0 layer and the L1 layer, in FIG. 10, as in the above-mentioned FIG. 4. FIG. 11 are a schematic structure diagram showing a physical structure in the case where the L1 layer film is further formed on the L0 layer film which is formed on the transparent substrate of the two-layer type optical disc in the third example of the information recording medium of the present invention (FIG. 11(*a*)) and a schematic structure diagram showing a physical structure in the case where the L0 layer and the L1 layer are pasted after each of the films is formed on a different substrate (FIG. 11(*b*)).

The data structure and the physical structure of the two-layer type optical disc in the third example of the information recording medium of the present invention are substantially the same as those of the first example explained with reference to FIGS. 1 to FIGS. 7.

In particular, as shown in FIGS. 10 and FIGS. 11, in the two-layer type optical disc in the third example of the information recording medium of the present invention, a light absorption or light scattering film 103-1*b* is provided on the L0 layer side of the reflective film 208 of the L1 layer, in a facing area of the L1 layer facing the control data zone CDZ of the L0 layer. By this, the laser light LB from the optical pickup can be focused not on the L1 layer but on the L0 layer, so that it is possible to certainly and quickly obtain the management information recorded in the control data zone CDZ of the L0 layer.

More specifically, it is possible to focus on the L0 layer, by displacing the position of the objective lens in the optical pickup up and down, under the control of focus servo using one S-shaped signal in the desired L0 layer. Thus, it is possible to certainly and quickly realize access to the management information such as a book type or the like, recorded in the control data zone CDZ of the L0 layer. The reason is as follows. At first, if the objective lens in the optical pickup is displaced in a direction of approaching the optical disc, only one S-shaped signal is obtained which is centered on the focused focal position at which the focus error signal of the reflected light from the semitransparent reflective film 108 of the L0 layer converges on "0". Even if the objective lens is further raised up and displaced in the direction of approaching the optical disc, the laser light LB transmitted through the semitransparent reflective film 108 of the L0 layer is absorbed or scattered by the light absorption or light scattering film 103-1*b* of the L1 layer, that is, the laser light LB is not reflected in the L1 layer. Thus, the S-shaped signal does not appear in the L1 layer, and the L1 layer is hardly focused on or not focused on at all.

By this, even in the optical disc in the third example, it is possible to receive the same benefits as those of the optical disc in the first example.

Fourth Example of Information Recording Medium

Next, with reference to FIGS. 12 to FIGS. 13, a detailed explanation will be given for the data structure of the two-layer type optical disc in the fourth example of the information recording medium of the present invention, the physical structure thereof, and the method of focusing on a desired recording layer upon the recording or reproduction of the optical disc. FIG. 12 are a data structure diagram showing the data structure of the two-layer type optical disc in the fourth example of the information recording medium of the present invention (FIG. 11(a)) and an enlarged diagram thereof (FIG. 11(b)). Incidentally, the laser light LB emitted from a not-illustrated semiconductor laser in the optical pickup 202 is focused by the objective lens 201, onto the L0 layer and the L1 layer, in FIG. 12, as in the above-mentioned FIG. 4. FIG. 13 are a schematic structure diagram showing a physical structure in the case where the L1 layer film is further formed on the L0 layer film which is formed on the transparent substrate of the two-layer type optical disc in the fourth example of the information recording medium of the present invention (FIG. 13(a)) and a schematic structure diagram showing a physical structure in the case where the L0 layer and the L1 layer are pasted after each of the films is formed on a different substrate (FIG. 13(b)).

The data structure and the physical structure of the two-layer type optical disc in the fourth example of the information recording medium of the present invention are substantially the same as those of the first example explained with reference to FIGS. 1 to FIGS. 7.

In particular, as shown in FIGS. 12 and FIGS. 13, in the two-layer type optical disc in the fourth example of the information recording medium of the present invention, the control data zone CDZ is provided in the L0 layer, and a light absorption or light scattering film 103-0b is laminated on the L1 layer side of the semitransparent reflective film 108 of the L0 layer. By this, by virtue of substantially the same operation as in the case of the above-mentioned third example, the laser light LB from the optical pickup can be focused not on the L1 layer but on the L0 layer, so that it is possible to obtain the management information recorded in the control data zone CDZ of the L0 layer, certainly and quickly.

By this, even in the optical disc in the fourth example, it is possible to receive the same benefits as those of the optical disc in the first example.

Fifth Example of Information Recording Medium

Next, with reference to FIGS. 14 to FIGS. 15, a detailed explanation will be given for the data structure of the two-layer type optical disc in the fifth example of the information recording medium of the present invention, the physical structure thereof, and the method of focusing on a desired recording layer upon the recording or reproduction of the optical disc. FIG. 14 are a data structure diagram showing the data structure of the two-layer type optical disc in the fifth example of the information recording medium of the present invention (FIG. 14(a)) and an enlarged diagram thereof (FIG. 14(b)). Incidentally, the laser light LB emitted from a not-illustrated semiconductor laser in the optical pickup 202 is focused by the objective lens 201, onto or toward the L0 layer and the L1 layer, in FIG. 14, as in the above-mentioned FIG. 4. FIG. 15 are a schematic structure diagram showing a physical structure in the case where the L1 layer film is further formed on the L0 layer film which is formed on the transparent substrate of the two-layer type optical disc in the fifth example of the information recording medium of the present invention (FIG. 15(a)) and a schematic structure diagram showing a physical structure in the case where the L0 layer and the L1 layer are pasted after each of the films is formed on a different substrate (FIG. 15(b)).

The data structure and the physical structure of the two-layer type optical disc in the fifth example of the information recording medium of the present invention are substantially the same as those of the first example explained with reference to FIGS. 1 to FIGS. 7.

In particular, as shown in FIGS. 14 and FIGS. 15, in the two-layer type optical disc in the fifth example of the information recording medium of the present invention, the control data zone CDZ is provided in the L0 layer, and a reflective film 103-0c is provided on the side of irradiation by the optical pickup 202 in the semitransparent reflective film 108 in the L0 layer and on the side of the semitransparent reflective film 108 in the recording layer of the information recording medium. Incidentally this reflective film 103-0c may have a function to adjust a reflection ratio. By this, the laser light LB from the optical pickup can be focused not on the L1 layer but on the L0 layer, so that it is possible to obtain the management information recorded in the control data zone CDZ of the L0 layer, certainly and quickly.

More specifically, it is possible to focus on the L0 layer, by displacing the position of the objective lens in the optical pickup up and down, under the control of focus servo using one S-shaped signal in the desired L0 layer. Thus, it is possible to certainly and quickly realize access to the management information such as a book type or the like, recorded in the control data zone CDZ of the L0 layer. The reason is as follows. At first, if the objective lens in the optical pickup is displaced in a direction of approaching the optical disc, only one S-shaped signal is obtained which is centered on the focused focal position at which the focus error signal of the reflected light from the reflective film 103-0c, provided on the side of irradiation by the optical pickup 202, of the semitransparent reflective film 108 of the L0 layer converges on "0". Even if the objective lens is further raised up and displaced in the direction of approaching the optical disc, the laser light LB reflected by the reflective film 103-0c of the L0 layer is obviously not transmitted through the semitransparent reflective film 108 of the L0 layer nor reflected in the L1 layer. Thus, the S-shaped signal does not appear in the L1 layer, and the L1 layer is hardly focused on or not focused on at all.

By this, even in the optical disc in the fifth example, it is possible to receive the same benefits as those of the optical disc in the first example.

Incidentally, in the fifth example, the reflective film 103-0c may be provided not adjacent to the semitransparent reflective film 108 but as substitute for a part of the semitransparent reflective film 108 in the control data zone CDZ.

(Information Reproducing Apparatus)

Next, with reference to FIG. 16, an information reproducing apparatus for the optical disc in the examples of the present invention will be discussed. FIG. 16(a) is a block diagram showing the entire structure of the information reproducing apparatus for the optical disc in the examples of the present invention, and FIG. 16(b) is a graph showing one example of a focus error signal in the examples of the present invention. Incidentally, in FIG. 16(b), the vertical axis indicates the intensity of the focus error signal (e.g. "Voltage"), and the horizontal axis indicates the position of the objective lens (e.g. "μm").

An information reproducing apparatus 200 is provided with: the optical disc 100; the optical pickup 202 which constitutes one example of the "reproducing device" of the present invention; a spindle motor 203; a head amplifier 204; a sum generation circuit 210; a pit data demodulation circuit 211; a pit data correction circuit 212; a buffer 213; an interface 214; a push-pull signal generation circuit 220; a low pass filter 221; a servo unit 222; and a CPU (Central Processing Unit) 300.

On the optical disc 100, pit data DP synchronized with a first clock signal CK1 is recorded by the length of a record mark 20. The first clock signal CK1 of a RF reproduction signal component is a signal which can be generated by the information reproducing apparatus 200 from the RF reproduction signal component of the optical disc 100 which varies in an almost constant cycle, in accordance with the wobbling, an unreadable emboss, or the like, as explained in the various examples of the optical disc 100 described above. In this example, the first clock signal CK1 is generated by the pit data demodulation circuit 211. Incidentally, in the example, the record mark 20 can be interpreted as a pit, and the track is constructed from this pit row.

More specifically, the information reproducing apparatus 200 is provided with: the optical pickup 202 for irradiating the optical disc 100 with a reproduction beam and outputting a signal in response to reflected light; the spindle motor 203 for controlling the rotation of the optical disc 100; and the servo unit 222. The first clock signal CK1 and a pit synchronization signal SYNCp are supplied to the servo unit 222. The servo unit 222 is synchronized with these signals, and performs spindle servo for controlling the rotation of the spindle motor 203, and focus servo and tracking servo for performing relative position control of the optical pickup 202 to the optical disc 100.

The optical pickup 202 is provided with a laser diode for irradiating the reproduction beam; and a not-illustrated four-division detection circuit. The four-division detection circuit divides the reflected light of the reproduction beam into four areas 1A, 1B, 1C, and 1D shown in the upper part of FIG. 16, and outputs each signal corresponding to the quantity of light in respective one of the areas. The head amplifier 204 amplifies each output signal of the optical pickup 202, and outputs a divisional read signal 1a corresponding to the area 1A, a divisional read signal 1b corresponding to the area 1B, a divisional read signal 1c corresponding to the area 1C, and a divisional read signal 1d corresponding to the area 1D. Incidentally, here, the focus error signal by astigmatism is detected, for example (refer to FIG. 16(b)).

The sum generation circuit 210 is provided with an addition circuit for adding the divisional read signals 1a, 1b, 1c, and 1d and for outputting a sum read signal SRF. Incidentally, the sum read signal SRF is a signal which represents the length of the record mark.

The pit data demodulation circuit 211 reproduces the pit data DP on the basis of the sum read signal SRF, and generates the first clock signal CK1. More specifically, the pit data demodulation circuit 211 demodulates the reproduced pit data DP by using a predetermined table, with the pit synchronization signal SYNCp as a reference position, to thereby generate reproduction data. For example, if EFM modulation is adopted as a modulating method, a process of converting 14-bit pit data DP to 8-bit reproduction data is performed. Then, a descramble process is performed in which the order of the reproduction data is rearranged in accordance with a predetermined rule, and the processed reproduction data is outputted.

The reproduction data obtained in this manner is supplied to the pit data correction circuit 212, on which an error correction process and an interpolation process are performed, and then, it is stored into the buffer 213. The interface 214 sequentially reads the data stored in the buffer 213, converts it in a predetermined output format, and outputs it to external equipment.

The push-pull signal generation circuit 220 calculates (1a+1d)−(1b+1c) and generates a push-pull signal. The component (1a+1d) corresponds to the areas 1A and 1D which are on the left side with respect to the reading direction, while the component (1b+1c) corresponds to the areas 1B and 1C which are on the right side with respect to the reading direction. The value of the push-pull signal indicates a relative position relationship between the reproduction beam and the track.

The push-pull signal is outputted to the servo unit 222 through the low pass filter 221. The servo unit 222 performs the tracking control on the basis of the push-pull signal.

The CPU 300 is connected through a not-illustrated bus or the like, and controls the entire information reproducing apparatus 200 by giving an instruction to each circuit or device or the like. Normally, software for operating the CPU 300 is stored in a not-illustrated memory or the like.

The CPU 300 is connected through a not-illustrated bus or the like, and controls the entire information reproducing apparatus 200 by giving an instruction to each circuit or device or the like. Normally, software for operating the CPU 300 is stored in a not-illustrated memory or the like.

In the examples, as one specific example of the information recording medium, a write-once type optical disc is explained, such as a two-layer type DVD-R. The present invention, however, can be also applied to a rewritable type optical disc, such as a two-layer type DVD-R/W. In addition, it can be also applied to a multiple layer type optical disc, such as a three-layer type, for example. Moreover, it can be also applied to a large-volume recording medium, such as a Blu-ray disc.

The present invention is not limited to the above-described examples, and various changes may be made, if desired, without departing from the essence or spirit of the invention which can be read from the claims and the entire specification. An information recording medium which involves such changes, is also intended to be within the technical scope of the present invention.

INDUSTRIAL APPLICABILITY

The information recording medium of the present invention can be applied as an information recording medium, such as a DVD, on which various information can be recorded at high density, for consumer use or for commercial use, for example.

The invention claimed is:
1. An information recording medium comprising:
a first recording layer in which a first recording track path to record therein record information is formed; and
a second recording layer which is laminated on said first recording layer and in which a second recording track path to record therein the record information is formed in a direction opposite to the first recording track path,
in one recording layer of said first and second recording layers, a predetermined area in which focus leading of laser light is performed reflecting the laser light, in the other recording layer of said first and second recording layers, a facing area which faces the predetermined area not reflecting the laser light,
wherein a light absorption or light scattering film is disposed in a portion corresponding to the facing area in the other recording layer.

2. The information recording medium according to claim 1, wherein a reflective film corresponding to the facing area is lacking in the other recording layer.

3. The information recording medium according to claim 1, wherein the one recording layer is disposed closer to a side where the laser light is irradiated than to the other recording layer, and the light absorption or light scattering film is disposed on a side of the facing area in a portion corresponding to the predetermined area.

4. The information recording medium according to claim 1, wherein the one recording layer is disposed closer to a side where the laser light is irradiated than to the other recording layer, and a whole reflective film is disposed in a portion corresponding to the predetermined area.

5. The information recording medium according to claim 1, wherein
the predetermined area is an area of a lead-in area in which control data is recorded, and
the facing area is a partial area of a lead-out area.

* * * * *